US009471636B2

United States Patent
Bornea et al.

(10) Patent No.: US 9,471,636 B2
(45) Date of Patent: *Oct. 18, 2016

(54) FINDING OPTIMAL QUERY PLANS

(71) Applicant: International Business Machines Corporation, Armonk, NY (US)

(72) Inventors: Mihaela A. Bornea, White Plains, NY (US); Julian Dolby, Bronx, NY (US); Achille B. Fokoue-Nkoutche, White Plains, NY (US); Anastasios Kementsietsidis, New York, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,300

(22) Filed: Jan. 12, 2016

(65) Prior Publication Data

US 2016/0154850 A1 Jun. 2, 2016

Related U.S. Application Data

(63) Continuation of application No. 14/088,574, filed on Nov. 25, 2013, now Pat. No. 9,280,584.

(51) Int. Cl.
  *G06F 17/30* (2006.01)
  *G06F 7/00* (2006.01)
(52) U.S. Cl.
  CPC ..... *G06F 17/30469* (2013.01); *G06F 17/3053* (2013.01); *G06F 17/30442* (2013.01); *G06F 17/30958* (2013.01); *G06F 17/30477* (2013.01); *G06F 17/30935* (2013.01)
(58) Field of Classification Search
  USPC ........................................................ 707/719
  See application file for complete search history.

(56) References Cited

U.S. PATENT DOCUMENTS

| 6,598,044 | B1 | 7/2003 | Waas et al. |
| 6,633,817 | B1* | 10/2003 | Walker ................... G06F 19/22 702/102 |
| 8,560,523 | B2* | 10/2013 | Larson .............. G06F 17/30457 707/705 |
| 8,838,579 | B2* | 9/2014 | Weyerhaeuser .. G06F 17/30442 707/717 |
| 2004/0060007 | A1* | 3/2004 | Gottlob ............. G06F 17/30932 715/234 |
| 2009/0259641 | A1 | 10/2009 | Balmin et al. |

(Continued)

OTHER PUBLICATIONS

M.A. Bornea et al., "Building an Efficient RDF Store Over a Relational Database," Proceedings of the ACM SIGMOD International Conference on Management of Data, Jun. 2013, pp. 121-132.

(Continued)

*Primary Examiner* — Kuen Lu
(74) *Attorney, Agent, or Firm* — Nidhi G. Kissoon; Ryan, Mason & Lewis, LLP

(57) ABSTRACT

Systems and methods for optimizing a query, and more particularly, systems and methods for finding optimal plans for graph queries by casting the task of finding the optimal plan as an integer programming (ILP) problem. A method for optimizing a query, comprises building a data structure for a query, the data structure including a plurality of components, wherein each of the plurality of components corresponds to at least one graph pattern, determining a plurality of flows of query variables between the plurality of components, and determining a combination of the plurality of flows between the plurality of components that results in a minimum cost to execute the query.

18 Claims, 13 Drawing Sheets

(56) References Cited

U.S. PATENT DOCUMENTS

| 2011/0153593 A1 | 6/2011 | Zhou et al. | |
|---|---|---|---|
| 2012/0066172 A1* | 3/2012 | Jebara | G06K 9/6297 706/52 |
| 2014/0149446 A1* | 5/2014 | Kuchmann-Beauger | G06F 17/30389 707/763 |

OTHER PUBLICATIONS

Surajit Chaudhuri, "An Overview of Query Optimization in Relational Systems," Proceedings of the 17th ACM SIGACT-SIGMOD-SIGART Symposium on Principles of Database Systems (PODS), Jun. 1998, pp. 34-43.
Goetz Graefe, "The Cascades Framework for Query Optimization," IEEE Data Engineering Bulletin, Sep. 1995, pp. 19-29, vol. 18, No. 3.
G. Graefe et al., "The EXODUS Optimizer Generator," Proceedings of the ACM SIGMOD International Conference on Management of Data, Dec. 1987, pp. 160-172, vol. 16, No. 3.
Y. Guo et al., "LUBM: A Benchmark for OWL Knowledge Base Systems," Web Semantics: Science, Services and Agents on the World Wide Web, Oct. 2005, pp. 158-182, vol. 3, Nos. 2-3.
L.M. Haas et al., "Extensible Query Processing in Starburst," Proceedings of the ACM SIGMOD International Conference on Management of Data, Jun. 1989, pp. 377-388, vol. 18, No. 2.
O. Hartig et al., "The SPARQL Query Graph Model for Query Optimization," Proceedings of the 4th European Conference on the Semantic Web: Research and Applications (ESWC), Jun. 2007, pp. 564-578, Innsbruck, Austria.
M. Jarke et al., "Query Optimization in Database Systems," ACM Computing Surveys (CSUR), Jun. 1984, pp. 111-152, vol. 16, No. 2.
L. Ma et al., "Towards a Complete OWL Ontology Benchmark," Proceedings of the 3rd European Conference on the Semantic Web: Research and Applications (ESWC), Jun. 2006, pp. 125-139.
A. Maduko et al., "Estimating the Cardinality of RDF Graph Patterns," Proceedings of the 16th International Conference on World Wide Web (WWW), May 2007, pp. 1233-1234, Banff, Alberta, Canada.
M. Morsey et al., "DBpedia SPARQL Benchmark—Performance Assessment with Real Queries on Real Data," Proceedings of the 10th International Conference on The Semantic Web (ISWC)—vol. Part 1, Oct. 2011, pp. 454-469.
M. Muralikrishna et al., "Equi-Depth Histograms for Estimating Selectivity Factors for Multi-Dimensional Queries," Proceedings of the ACM SIGMOD International Conference on Management of Data, Jun. 1988, pp. 28-36.
T. Neumann et al., "The RDF-3X Engine for Scalable Management of RDF Data," The VLDB Journal—The International Journal on Very Large Data Bases, Feb. 2010, pp. 91-113, vol. 19, No. 1.
V. Poosala et al., "Improved Histograms for Selectivity Estimation of Range Predicates," Proceedings of the ACM SIGMOD International Conference on Management of Data, Jun. 1996, pp. 294-305, vol. 25, No. 2, Montreal, Canada.
M. Schmidt et al., "SP2Bench: A SPARQL Performance Benchmark," CoRR abs/0806.4627, Oct. 2008, 19 pages.
P.G. Selinger et al., "Access Path Selection in a Relational Database Management System," Proceedings of the ACM SIGMOD International Conference on Management of Data, May-Jun. 1979, pp. 23-34.
M. Stocker et al., SPARQL Basic Graph Pattern Optimization Using Selectivity Estimation, Proceedings of the 17th International Conference on World Wide Web (WWW), Apr. 2008, pp. 595-604, Beijing, China.
P. Tsialiamanis et al., "Heuristics-Based Query Optimisation for SPARQL," 15th International Conference on Extending Database Technology (EDBT), Mar. 2012, pp. 324-335, Berlin, Germany.
List of IBM Patents or Patent Applications Treated as Related.

* cited by examiner

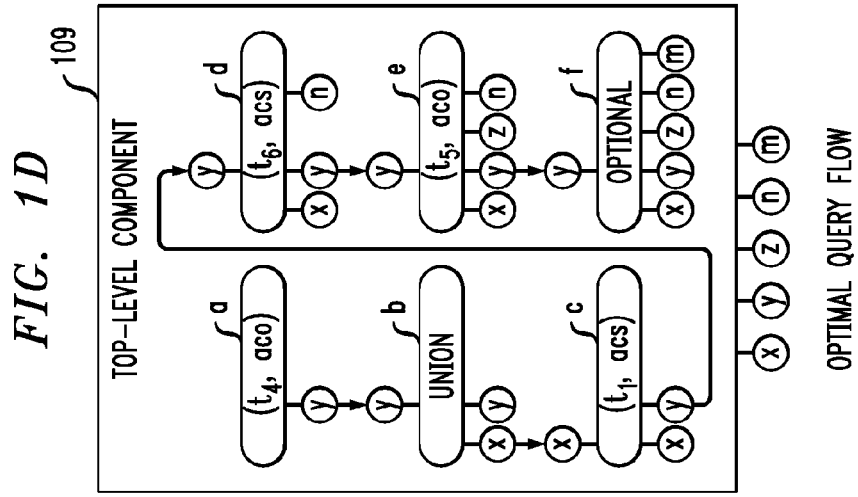
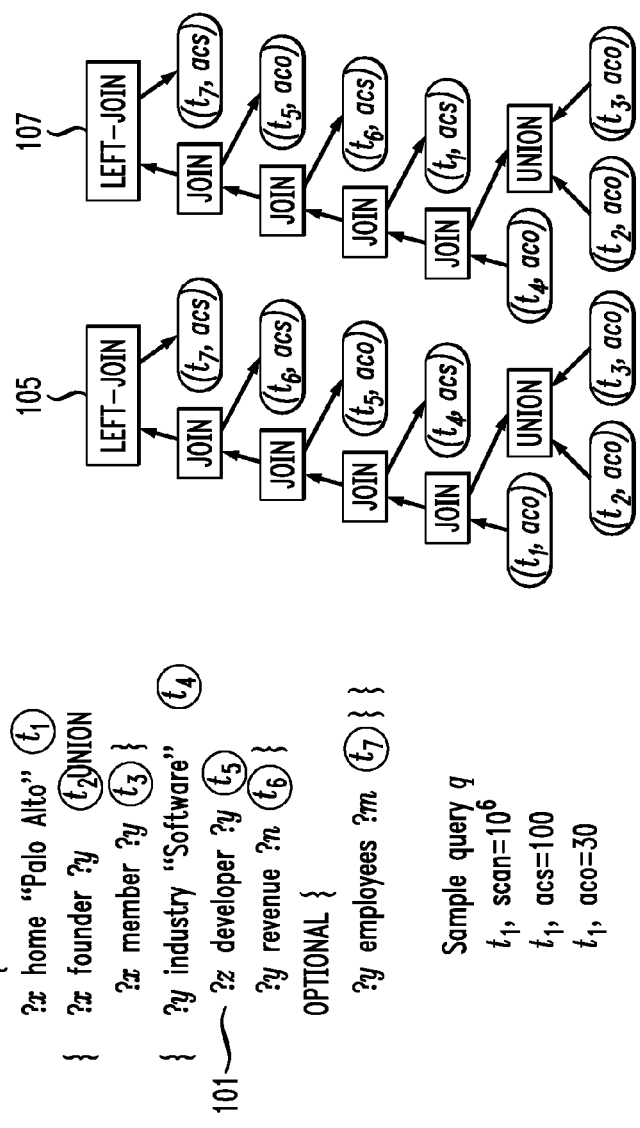

FIG. 4

```
ALGORITHM 1: MakeComponents

Data: (GP, PR) where GP is a graph pattern and PR is the set of
      components containing all potential predecessors of components
      to create.
Result: C a set of components responsible for the evaluation of GP
1  begin
2  |   C ← ∅;
3  |   available ← outputVariables(PR) ;
4  |   if type(GP) = TRIPLE then
5  |   |   foreach acm ∈ M do
6  |   |   |   input ← R(GP,amacm) ;
7  |   |   |   if input = ∅ then available ← P(GP, amacm) ;
8  |   |   |   else available ← available ∪ P(GP, amacm) ;
9  |   |   |   proxies ← makeProxies(PR) ;
10 |   |   |   EV ← makeExternalView(input, available) ;
11 |   |   |   C ← C ∪ (EV, (proxies, ∪_{p∈proxies} externalGraph(p)), acm) ;
12 |   |   end
13 |   else
14 |   |   if type(GP) = OPTIONAL then input ← mand(GP) ;
15 |   |   else input ← inscopevars(GP) ;
16 |   |   available ← available ∪ input ;
17 |   |   EV ← makeExternalView (input, available) ;
18 |   |   IV ← makeInternalView(GP, PR) ;
19 |   |   C ← C ∪ (EV, IV, type(GP)) ;
20 |   end
21 end
```

FIG. 5

| | ALGORITHM 2: MakeInternalView |
|---|---|
| | Data: $(GP, PR)$ where $GP$ is a graph pattern and $PR$ is the set of components containing all potential predecessors of the internal view to create.<br>Result: $(SC, C^i = (V^i, E^i))$ the internal view of the component responsible for the evaluation of $GP$ |
| 1 | begin |
| 2 |    $(V^i, E^i, SC$ children$) \leftarrow (\emptyset,\emptyset,\emptyset,\emptyset)$ ; |
| 3 |    $available \leftarrow$ outputVariables$(PR)$ ; |
| 4 |    $proxies \leftarrow$ makeProxies$(PR)$ ; |
| 5 |    $V^i \leftarrow \cup_{p \in proxies}$ vertices(externalGraph$(p)$) ; |
| 6 |    $E^i \leftarrow \cup_{p \in proxies}$ edges(externalGraph$(p)$) ; |
| 7 |    foreach $sub\text{-}pattern$ $SGP$ of $GP$ do |
| 8 |       foreach $(EV = (G^e = (V^e, E^e), var), IV, t) \in$ makeComponents$(SGP, proxies)$ do |
| 9 |          $(V^i, E^i) \leftarrow (V^i \cup V^e, E^i \cup E^e)$ ; |
| 10 |          $children \leftarrow children \cup (EV, IV, t)$ ; |
| 11 |       end |
| 12 |    end |
| 13 |    foreach $(EV_1 = (IP_1, bb_1, OP_1, var_1), IV_1, t_1) \in proxies$ do |
| 14 |       foreach $(EV_2 = (IP_2, bb_2, OP_2, var_2), IV_2, t_2) \in children$ do<br>         $E^i \leftarrow E^i \cup \{(n_1, n_2) | n_1 \in OP_1 \wedge n_2 \in IP_2 \wedge var_1(n1) = var_2(n2)\}$ ; |
| 15 |    end |

```
16  if type(GP) = AND then
17      available ← available ∪ inscopevars(GP) ;
18      for i ← 1 to |subPatterns(GP)| - 1 do
19          EV = (G^e = (V^e, E^e), var) ←
                makeExternalView(inscopevars(GP), available) ;
20          (V^i, E^i) ← (V^i ∪ V^e, E^i ∪ E^e) ;
21          children ← children ∪ (EV, (∅,∅), JOIN) ;
22      end
23      for i ← 1 to |joinVariables(GP)| - 1 do
24          EV = (G^e = (V^e, E^e), var) ←
                makeExternalView(inscopevars(GP), available) ;
25          (V^i, E^i) ← (V^i ∪ V^e, E^i ∪ E^e) ;
26          children ← children ∪ (EV, (∅,∅), PRODUCT) ;
27      end
28      foreach p ∈ children do addPredecessors(p, children - {p}) ;
29      foreach C_1 = (EV_1 = IP_1, bb_1, OP_1, var_1), IV_1, t_1) ∈ children do
30          foreach C_2 = (EV_2 = (IP_2, bb_2, OP_2, var_2), IV_2, t_2) ∈ children do
31              if C_1 ≠ C_2 then
                    E^i ← E^i ∪ {(n_1, n_2)|n_1 ∈ OP_1 ∧ n_2 ∈ IP_2 ∧ var_1(n1) =
                    var_2(n2) ∧ (t_1 ≠ PROXY ∨ t_2 ∉ {JOIN, PRODUCT})} ;
32              end
33          end
34      end
35      SC ← proxies ∪ children ;
36  end
```

| ALGORITHM 3: toAnnotatedExpr |
|---|

Data: $(\delta, c)$ where $\delta$ is an candidate solution satisfying all the ILP constraints, $c$ is an activated component for the solution $\delta$, and $\Delta(c)$'s internal view $IV = (SC, G = (V_0 \cup V_1, E_1))$ has vertices in $V_0$ without input or output pins and vertices in $V_1$ with at least one pin.
Result: $(e, am, jan)$ the annotated algebraic expression of $\Delta(c)$ 1  begin
2    switch $type(c)$ do
3      case $type(c) \in \mathcal{M}$: $(e, am(e), \emptyset) \leftarrow (key(c), type(c), \emptyset)$ ;
4      case OPTIONAL: $(e, am, jan) \leftarrow$ toAnnotatedExpr$(\delta,$ uniqueNonProxy$(SC))$ ;
5      case UNION:
6        $l \leftarrow$ sortByCost(nonProxies$(SC))$ ;
7        $(e, am, jan) \leftarrow (null, \emptyset, \emptyset)$ ;
8        for $i \leftarrow 2$ to $|l| - 1$ do
9          $(e_i, am_i, jan_i) \leftarrow$ toAnnotatedExpr$(\delta, l_i)$ ;
10         $e \leftarrow e = null$ ? $e_i$ : UNION$(e, e_i)$ ;
11         $(am, jan) \leftarrow$ union$((am, jan), (am_i, jan_i))$ ;
12       end
13   end
14   case AND:
15     $(e, am, jan) \leftarrow (null, \emptyset, \emptyset)$ ;
16     foreach $sc$ s.t. $blackbox(sc) \in$ sortByCost$(V_0)$ do
17       $(e_{sc}, am_{sc}, jan_{sc}) \leftarrow$ toAnnotatedExpr$(\delta, sc)$ ;
18       $e \leftarrow e = null$ ? $e_{sc}$ : PRODUCT$(e, e_{sc})$ ;
19       $(am, jan) \leftarrow$ union$((am, jan), (am_{sc}, jan_{sc}))$ ;
20     end
21     $l \leftarrow$ topologicalSort$(G_1 = (V_1, E_1), \{sc | blackbox(sc) \in V_1\})$ ;
22     $map \leftarrow \emptyset$ ;
23     for $i \leftarrow 0$ to $|l| - 1$ do

```
24        if type(l_i) ∉ {JOIN, PRODUCT} then
25            (e_i, am_i, jan_i) ← toAnnotatedExpr(δ, l_i) ;
26            (am, jan) ← union((am, jan), (am_i, jan_i)) ;
27            if i = 0 ∧ e ≠ null then e_i ← PRODUCT(e, e_i) ;
28            p ← uniqueNonProxyPredecessor(l_i) ;
29            if p ≠ null then
30                e_p ← getValue(map, p) ;
31                if type(l_i) = OPTIONAL then e_i ← LEFT JOIN(e_p, e_i) ;
32                else e_i ← JOIN(e_p, e_i) ;
33                jan(e_i) ← LINEAR ;
34            end
35        else
36            (p_1, p_2) ← sortByCost(nonProxyPredecessors(l_i)) ;
37            (a, b) ← (getValue(map, p_1), getValue(map, p_2)) ;
38            if type(l_i) = PRODUCT then e_i ← PRODUCT(a, b) ;
39            else
40                if p_1 & p_2 not optional w/o non-proxy predecessors then
                       e_i ← JOIN(a, b) ;
41                else
42                    // p_2 is the optional without non-proxy predecessors;
43                    e_i ← LEFT JOIN(a, b) ;
44                end
45                jan(e_i) ← REGULAR ;
46            end
47        end
48        map ← (l_i, e_i) ; e ← e_i ;
49    end
50   end
51 endsw
52 end
```

| | ALGORITHM 4: toILPSolution |
|---|---|
| | Data: $(ae = (e, am, jan), \rho, C, p, PP)$ where $ae$ is an annotated algebraic expression, $\rho$ is a function that associates a SPARQL algebraic expression $u$ to the set of SPARQL graph patterns it represents, $C$ is a set of components $c$ such that $key(c)$ contains all elements in $\rho(e)$, $p$ is the unique activated non-proxy predecessor of the activated component in $C$, and $PP$ is a set of activated potential proxy predecessors. |
| | Result: $\delta$ an candidate solution satisfying all the ILP constraints |
| 1 | begin |
| 2 |   switch $type(e)$ do |
| 3 |     case $e = BGP(t)$ |
| 4 |       foreach $c \in C$ do |
| 5 |         if $type(c) \neq am(e)$ then $\delta(\alpha(blackbox(c))) \leftarrow 0$ ; |
| 6 |         else |
| 7 |           $\delta(\alpha(blackbox(c))) \leftarrow 1$ ; |
| 8 |           setInputPins$(c, required(e))$ ; |
| 9 |           connectToPredecessors$(c, \{p\}, PP, required(e))$ ; |
| 10 |           setOutputPins$(c, vars(output(p)) \cup available(e))$ ; |
| 11 |         end |
| 12 |       end |
| 13 |     end |
| 14 |     case $e = \text{LEFT JOIN}(e_1, e_2)$ or $e = \text{JOIN}(e_1, e_2)$ |
| 15 |       $c \leftarrow$ unique element of $C$ ; |
| 16 |       if $\delta(\alpha(blackbox(c)))$ is not defined then |
| 17 |         $\delta(\alpha(blackbox(c))) \leftarrow 1$ ; |
| 18 |         setOutputPins$(c, vars(output(p)))$ ; |
| 19 |         foreach $m \in subcomp(c)$ s.t. $type(m) \in \{\text{JOIN, OPTIONAL}\}$ do $\delta(\alpha(blackbox(m))) \leftarrow 0$ ; |
| 20 |       end |
| 21 |       setInputPins$(c, required(e))$ ; |
| 22 |       setOutputPins$(c, available(e))$ ; |
| 23 |       $C_1 \leftarrow$ findComponents$(e_1, \rho, C)$ ; |
| 24 |       $C_2 \leftarrow$ findComponents$(e_2, \rho, C)$ ; |
| 25 |       $\delta_1 \leftarrow$ toILPSolution$((e_1, am, jan), \rho, C_1, p, PP)$ ; |
| 26 |       if $jan(e) = \text{LINEAR}$ then $\delta_2 \leftarrow$ toILPSolution$((e_2, am, jan), \rho, C_2, \Delta_1(C_1), PP)$ ; |

```
27       else
28         δ₂ ← toILPSolution((e₂, am, jan), ρ, C₂, null, PP) ;
29         if jan(e) = PRODUCT then j ←
             getInactivatedProductSubComp(c) ;
30         else j ← getInactivatedJoinSubComp(c) ;
31         δ(α(blackbox(j))) ← 1 ;
32         jinput ← vars(output(Δ₁(C₁))) ∪ vars(output(Δ₂(C₂))) ;
33         setInputPins(j, jinput) ;
34         connectToPredecessors(j, {Δ₁(C₁), Δ₂(C₂)}, ∅, jinput) ;
35         setOutputPins(j, jinput) ;
36       end
37       δ ← union(δ, δ₁, δ₂) ;
38    end
39    case e = UNION(e₁, e₂)
40       c ← unique element of C ;
41       if δ(α(blackbox(c))) is not defined then
42         δ(α(blackbox(c))) ← 1 ;
43         setOutputPins(c, vars(output(p))) ;
44       end
45       setInputPins(c, required(e)) ;
46       setOutputPins(c, available(e)) ;
47       connectToPredecessors(c, {p}, PP, required(e))) ;
48       C₁ ← findComponents(e₁, ρ, C) ;
49       C₂ ← findComponents(e₂, ρ, C) ;
50       δ₁ ← toILPSolution((e₁, am, jan), ρ, C₁, p, PP) ;
51       δ₂ ← toILPSolution((e₂, am, jan), ρ, C₂, p, PP) ;
52       δ ← union(δ, δ₁, δ₂) ;
53    end
54 endsw
```

*FIG. 7 cont.*

TABLE 1. QUERY OPTIMALITY RESULTS

| DATASET | #QUERIES | DESCRIPTION | AVG TIME(S) | #SUBOPTIMAL |
|---|---|---|---|---|
| LUBM | 12 | QL EXPANSION OF QUERIES 1-12 | 0.45 | 1 |
| UOBM | 14 | QL EXPANSION OF QUERIES 1-14 | 5.39 | 2 |
| SP2Bench | 17 | ALL 17 QUERIES USED | 12.17 | 2 |
| DBpedia | 20 | QUERIES FROM [12] FOR DBPedia 3.7 | 2.10 | 2 |
| PRBench | 28 | PRIVATE TOOL INTEGRATION DATA[1] | 17.14 | NONE |

FINDING OPTIMAL QUERY PLANS

CROSS-REFERENCE TO RELATED APPLICATION

This application is a Continuation of U.S. patent application Ser. No. 14/088,574, filed on Nov. 25, 2013, the disclosure of which is incorporated herein by reference in its entirety.

TECHNICAL FIELD

The field generally relates to systems and methods for optimizing a query, and more particularly, to systems and methods for finding optimal plans for graph queries by casting the task of finding the optimal plan as an integer programming (ILP) problem.

BACKGROUND

Obtaining good performance for declarative query languages requires an optimized total system, with an efficient data layout, good data statistics, and careful query optimization. One key piece of such systems is a query planner that translates a declarative query into a concrete execution plan with minimal cost. In graph databases, for example, resource description framework (RDF) stores (e.g., IBM® DB2® RDF store), a given complex graph query, for example, a complex SPARQL Protocol and RDF Query Language (SPARQL) query, can be executed in a large variety of semantically equivalent ways. Each such execution plan may produce the same results, but at different computation costs. A query planning objective is to find, for a given query, an execution plan with the minimum cost. Methods for determining the execution plan with the minimum cost have been studied. One known solution builds a cost-model that, based on data statistics, is able to estimate the cost of a given query execution plan. However, since the number of execution plans can be large, typically, only a small subset of all valid plans are constructed using, for example, heuristics and/or greedy approaches that consider plans likely to have a low cost. The cost of the selected candidate plans are then estimated using the cost-model, and the cheapest plan is selected for execution. Because only a small subset of all valid plans are constructed, the chosen plan is thus not guaranteed to be optimal. In other words, the chosen plan is a local optimal solution, but not guaranteed to be a global optimal solution.

Some graph databases (e.g., IBM® DB2® RDF store or Oracle®) are built on top of highly optimized relational database management systems (RDBMS). Evaluation of complex graph queries in RDBMS systems has been performed by translating the complex graph queries into structured query language (SQL) queries that are then evaluated by the underlying RDBMS. Relational systems have been known to perform query optimization, so one might suppose that a naive translation from a graph query language, such as SPARQL, to SQL would be sufficient, since a relational optimizer can optimize the SQL query once the translation has occurred. However, in practice, important performance gains can occur when SPARQL and the SPARQL to SQL translation are independently optimized. Again, like the query planning issue discussed in the previous paragraph, a given SPARQL query, for example, can be translated into a multitude of semantically equivalent SQL queries with vastly different execution costs.

Known graph databases either: 1) mostly ignore this graph query planning issue, simply performing a naive translation to SQL and relying on the RDBMS SQL optimizer, or 2) partially address the issue in a suboptimal way by using heuristics and/or greedy approaches, and considering cost (e.g., based on a cost-model and data statistics) of a very small subset of potential translations. In both cases, the resulting translation is suboptimal, and it is not clear how far it is from the translation resulting in the minimal cost.

Even with sub-optimal plans, the performance of an optimizer may still be considered satisfactory if it performs better (e.g., in terms of evaluation times) when compared to other competing optimizers. Yet, there is an alternative metric to measure how well the optimizer performs: how far its local optimal plans are from global optimal plans. However, no mechanism exists for assessing whether these optimizers produce optimal plans given the data layout and statistics available.

Accordingly, there is need for systems and methods for producing optimal search query plans and accurately assessing how close a given query solution is to an optimal solution.

SUMMARY

In general, exemplary embodiments of the invention include systems and methods for optimizing a query, and more particularly, to systems and methods for finding optimal plans for graph queries by casting the task of finding the optimal plan as an integer programming (ILP) problem.

According to an exemplary embodiment of the present invention, a system for optimizing a query, comprises a construction module capable of building a data structure for a query, the data structure including a plurality of components, wherein each of the plurality of components corresponds to at least one graph pattern, a flow module capable of determining a plurality of flows of query variables between the plurality of components, and a cost determination and ranking module capable of determining a combination of the plurality of flows between the plurality of components that results in a minimum cost to execute the query.

According to an exemplary embodiment of the present invention, a method for optimizing a query, comprises building a data structure for a query, the data structure including a plurality of components, wherein each of the plurality of components corresponds to at least one graph pattern, determining a plurality of flows of query variables between the plurality of components, and determining a combination of the plurality of flows between the plurality of components that results in a minimum cost to execute the query.

According to an exemplary embodiment of the present invention, an article of manufacture comprises a computer readable storage medium comprising program code tangibly embodied thereon, which when executed by a computer, performs method steps for optimizing a query, the method steps comprising building a data structure for a query, the data structure including a plurality of components, wherein each of the plurality of components corresponds to at least one graph pattern, determining a plurality of flows of query variables between the plurality of components, and determining a combination of the plurality of flows between the plurality of components that results in a minimum cost to execute the query.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIGS. 1A-1D illustrate an example of a sample query, cost of a triple, two syntactic reorderings and an optimal query flow, according to an exemplary embodiment of the present invention.

FIG. 4 illustrates Algorithm 1 for building components, according to an exemplary embodiment of the present invention.

FIG. 5 illustrates Algorithm 2 for constructing an internal view of a component, according to an exemplary embodiment of the present invention.

FIG. 6 illustrates Algorithm 3, which shows a concrete implementation of a which converts a candidate solution in $ILPS_q$ into a plan in $U_q$, according to an exemplary embodiment of the present invention.

FIG. 7 illustrates Algorithm 4, which shows a concrete implementation of β which converts a plan in $U_q$ into a candidate solution in $ILPS_q$, according to an embodiment of the present invention.

DETAILED DESCRIPTION OF EXEMPLARY EMBODIMENTS

Figure 2:
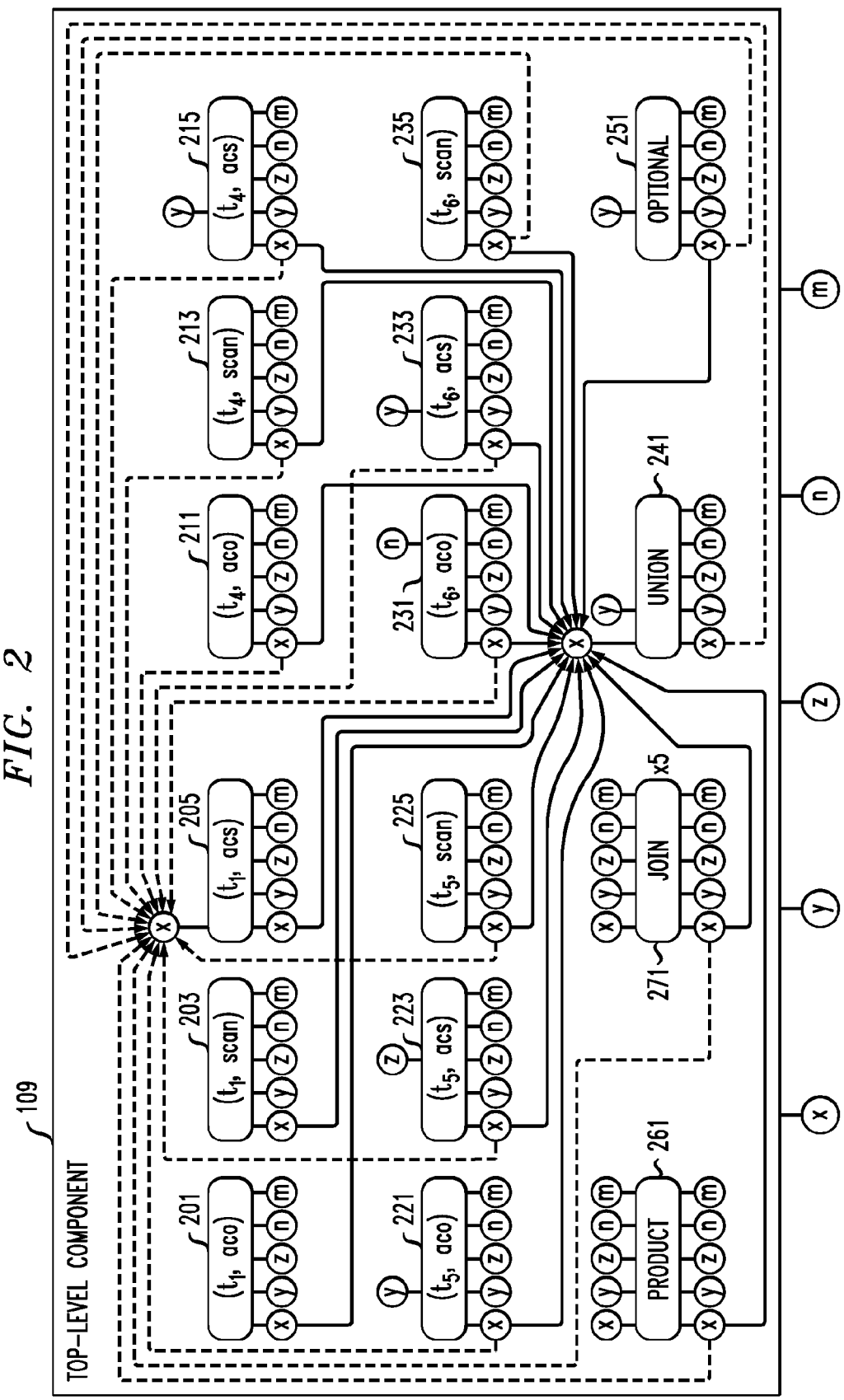
FIG. 2 illustrates internal components of a top level component of FIG. 1D, according to an exemplary embodiment of the present invention

Exemplary embodiments of the invention will now be discussed in further detail with regard to systems and methods for optimizing a query, and more particularly, to systems and methods for finding optimal plans for graph queries by casting the task of finding the optimal plan as an integer programming (ILP) problem. This invention may, however, be embodied in many different forms and should not be construed as limited to the embodiments set forth herein.

Embodiments of the present invention provide systems and methods for finding optimal plans for graph queries. Finding the optimal plans can be classified as a non-deterministic polynomial-time hard (NP-hard) problem. Embodiments of the present invention find optimal plans by casting the task of finding the optimal plan as an integer programming (ILP) problem. An ILP problem includes an objective function (e.g., the cost of executing the query) that needs to be minimized under a set of inequality constraints. In accordance with an embodiment, these constraints encode the semantics of an input graph query and of valid execution plans. The objective function and the set of constraints are expressed as linear expressions over a set of variables, some of which can be restricted to take only integer values.

Highly optimized commercial solvers (e.g., IBM® ILOG CPLEX) may be used to perform the embodiments of the present invention. In addition, the ILP formulation according to embodiments of the present invention can be used to evaluate the effectiveness of greedy/heuristic planning solutions. For example, an integer programming formulation of an embodiment of the present invention can be used to precompile specific queries that may occur frequently within a workload, and/or test the greedy/heuristic solution to determine how far away the solution is from the optimal solution.

Accordingly, in general, embodiments of the present invention present a formulation of a query planning problem which decouples it from the actual resolution of the problem, and show how to translate that formulation into an ILP problem. Embodiments of the present invention are described herein in connection with SPARQL 1.0, but are not limited thereto. Additionally, embodiments of the present invention are described as being applied to a planner in DB2® RDF.

Section 1 of this disclosure set forth below presents an algebraic representation of SPARQL queries, and describes how this representation is used to introduce a universe of alternative query plans for an input query q. Planning for this universe is an NP hard problem. Section 2 of this disclosure set forth below describes casting the planning problem as an ILP problem. More specifically, embodiments of the present invention are inspired by electronic circuit design, and represented by a circuit board that captures a whole universe of plans. In accordance with embodiments of the present invention, appropriate constraints and cost functions are introduced and an ILP solver is used to identify an optimal sub-circuit in a board that connects all the circuit components (i.e., all of the input query sub-patterns) which correspond to the optimal query plan. The experimental examples set forth below empirically demonstrate that the embodiments of the present invention are a practical formalization of the optimization problem, for testing query planners and offline query optimization.

1. The SPARQL Query Planning Problem 1.1 Planning Problem Input

In accordance with embodiments of the present invention, there are three inputs to the process of SPARQL planning:

1. The query q: The SPARQL query conforms to the SPARQL standard. Therefore, each query q is composed of a set of hierarchically nested graph patterns P, with each graph pattern p∈P being either a simple triple pattern[1] or more complex patterns such as AND, UNION, or OPTIONAL. An expression in RDF is a collection of triples, each triple consisting of a subject, a predicate and an object. The assertion of an RDF triple conveys a relationship, indicated by the predicate, between the things denoted by subject and object of the triple (e.g., Bill (subject) lives in (predicate) Palo Alto (object)).

[1] Without limitation, to simplify exposition, the same notation as the SPARQL algebra (see section 18 of the SPARQL 1.1 Query Language, World Wide Web Consortium (W3C) Recommendation, Mar. 21, 2013, http://www.w3.org/TR/sparql11-query/) is reused, and every triple is assumed to appear in a singleton Basic Graph Pattern (BGP).

2. The access methods M: Access methods provide alternative ways to evaluate a pattern P∈P. The methods are system-specific, and dependent on existing indexes in the store. For example, a store might have subject indexes to access a triple by subject (access-by-subject (acs)), by object (access-by-object (aco)), and by a scan (access-by-scan (scan)).

3. The cost C: Each access method for a pattern P is annotated with a cost, based on system specific notions of how expensive it is to execute the method. The cost C may be derived from statistics maintained by the system about the characteristics of a particular dataset, or known costs for a particular access method (e.g., scans are more expensive than index based access).

FIGS. 1A-1D illustrate an example of a sample query, cost of a triple, two syntactic reorderings and an optimal query flow, according to an exemplary embodiment of the present invention. FIG. 1A shows a sample input where query q (first input) 101 retrieves the people that founded or are board members of companies in the software industry, and live in "Palo Alto". For each such company, the query retrieves the products that were developed by the company, its revenue, and optionally its number of employees. The query q 101 includes triples $t_1$, $t_2$, $t_3$, $t_4$, $t_5$, $t_6$ and $t_7$. As can be seen, variables x, y, z, n and m are associated with one or more triples. Variables can be, for example, names of people, companies, company revenue, number of employees, or any other data types that are retrieved through a query. In addition, the variables may occupy subject and object locations of a triple.

Three different access methods (second input) are assumed in M, one that performs a data scan (scan), one that retrieves all the triples given a subject (acs), and one that retrieves all the triples given an object (aco). Depending on an access method and provided information for a triple, a subject or object variable may be required as an input before retrieving data for a given triple. The cost C 103 for accessing a specific pattern p, given an access method, is the third input, an example of which is shown for triple $t_1$ in FIG. 1B. As an example, the cost associated with performing a blanket data scan of all elements in the database is highest, with $10^6$ elements being scanned, whereas retrieving triples given an object (e.g., Palo Alto), has the lowest cost, with 30 elements. This query will form our running example and the rest of the figure will be explained in the following sections. It is to be understood that the query q is used as an illustrative example, and that embodiments of the invention are not limited to this particular query.

1.2 Query Flattening

To simplify the planning process, embodiment of the present invention introduce a function flat(q) to eliminate unnecessary syntactic nesting that might occur in the query. Specifically, since each query q is composed of a set of hierarchically nested graph patterns P, for each graph pattern $p \in P_{AND}$ (i.e., the set of AND patterns in q), nested AND patterns are flattened because they do not reflect any change in the semantics of the SPARQL query. Note that when the query q is flattened, it is ensured that any OPTIONAL pattern associated with a nested AND pattern stays scoped with the AND pattern to make it equivalent to the query.

1.3 Planning Problem Formulation

Given a query q, section 18 of the SPARQL 1.1 Query Language, World Wide Web Consortium (W3C) Recommendation (Mar. 21, 2013, http://www.w3.org/TR/sparql11-query) ("SPARQL specification") defines a transformation of q into an algebraic expression, denoted algebra(q), that corresponds to a valid evaluation of the query. The tree 105 on the left in FIG. 1C shows algebra(flat(q)) for our example query.

Due to the guaranteed correctness of the transformation from a query to a SPARQL algebraic expression, the SPARQL algebra is a good starting point to define a valid execution plan of a query. However, the algebraic expression generated for a query q can be underspecified in that it implies an execution order, but, for example, it does not specify the access method to use to access a given triple pattern. Also, the implied execution order only mirrors the order in which patterns appear in the original query (no join order optimization). Thus, the evaluation order entailed by the generated algebraic expression is likely to be suboptimal.

Embodiments of the present invention define a valid plan as an annotated SPARQL algebraic expression. Annotations make an algebraic expression fully specified and executable. Annotations indicate, for example, the precise access method used to access a triple pattern, or, for a JOIN node, whether it is a PRODUCT (i.e., when the two operands of the JOIN node have no variables in common). Then, a generalization is presented of the transformation from a SPARQL query to a SPARQL algebraic expression that, for a given query q, generates a very large universe $U_q$ of valid plans of q. Plans in $U_q$ are obtained by considering all permutations of elements in all AND patterns of the flattened query flat(q) and all valid annotations of all algebraic nodes. Finally, the query planning problem is defined as finding a plan in $U_q$ with the lowest cost.

Annotated SPARQL Algebra.

The access method annotation function, denoted am, maps a Basic Graph Pattern (BGP) containing a single triple t in algebra(flat(q)) to an access method $m \in M$ to use to evaluate t. But patterns are not the only part of the algebra that requires an annotation. Indeed, if left without annotation, the JOIN operator is ambiguous. A JOIN($e_1$, $e_2$) operation can stand for one of many types of join implementations, each with a different cost. For example, JOIN ($e_1$,$e_2$) can represent one of the following three concrete operations: (1) a cartesian product operation if $e_1$ and $e_2$ have no variables in common, (2) an efficient filter (or linear) join if at least one required variables of $e_2$ is produced by $e_1$ (in this case $e_1$ is evaluated first and its results are fed to $e_2$ for evaluation), (3) a regular join in which $e_1$ and $e_2$ are independently evaluated and then merged. Likewise, LEFT-JOIN ($e_1$,$e_2$) can represent either an efficient filter (or linear) left outer join (when at least one required variable of $e_2$ is produced by $e_1$) or regular left join.

So, a join can be implemented like a Nested Loop Join, with a cost that might be quadratic to the size of the join inputs, or it can be implemented like a Hash Join, with a cost that is only linear to its input. Like the access methods for patterns, the available join implementations are system-specific. To appropriately determine the cost of a query plan, it is important to identify which join implementation will be used for each join operation.

The second annotation function, called join annotation function and denoted jan, maps a join expression to one element of the set A={PRODUCT, LINEAR, REGULAR} to indicate the precise nature of the join to be performed, and it maps a left join to an element of A—{PRODUCT}. Notice that a cartesian product is considered as a special form of a join. Beyond joins, the same annotation function jan will be used in plans to map left-outer-join operations to their respective implementations (left-outer-joins operations are needed for the OPTIONAL operator in SPARQL).

Given an access method annotation function am and a join annotation function jan, the required variables function, denoted required[am, jan] (or simply required when there is no ambiguity), and the available variables function, denoted available[am, jan] (or simply available) are defined. For an algebraic sub-expression e in algebra(flat(q)), required(e) is the set of all variables required to evaluate e, and available (e) is the set of all variables available after the evaluation of e.

The intuition for these additional functions is illustrated through an example. Assume that $am(t_1)$=acs, that is, the access method for pattern $t_1$ in FIG. 1A is acs. To evaluate $t_1$ with this access method, the subject variable ?x must be provided. Therefore, required($t_1$)={?x}. Similarly, if $am(t_5)$ =aco, then available($t_5$)={?z, ?y}.

These two functions can be defined inductively for all types of expressions. Due to space limitation, they are presented only for BGP, JOIN, LEFTJOIN, and UNION:

$e$=BGP($t$): required($e$)=R($t$,am($e$)) and available($e$)=R ($t$,am($e$))$\dot{E}$P($t$,am($e$))

($e$=JOIN($e_1$,$e_2$) or $e$=LEFT JOIN($e_1$,$e_2$)) and jan($e$) =LINEAR: required($e$)=required($e_1$)$\dot{E}$(required ($e_2$)−available($e_1$)) and available($e$)=available ($e_1$)$\dot{E}$ available($e_2$)

otherwise($e$=OP($e_1$,$e_2$) and OP∈{JOIN,LEFTJOIN, UNION}): required($e$)=required($e_1$)$\dot{E}$ required ($e_2$) and available($e$)=available($e_1$)$\dot{E}$ available ($e_2$)

In accordance with an embodiment, an annotated SPARQL algebraic expression is a tuple (e, am, jan) such that: (1) e is a SPARQL algebraic expression whose BGP sub-expressions consist of a single triple, (2) am is a function that maps each BGP sub-expression of e to an access method m∈M, and (3) jan is a function that maps each JOIN or LEFTJOIN sub-expression of e to an element of {PRODUCT, LINEAR, REGULAR} such that, for two algebraic expressions $e_1$ and $e_2$:

$jan$(LEFT JOIN($e_1$,$e_2$))∈{LINEAR,REGULAR}

$jan$(JOIN($e_1$,$e_2$))=PRODUCT iff. available($e_1$)ç available($e_2$)=∅

($jan$(op($e_1$,$e_2$))=LINEAR^op∈{JOIN,LEFTJOIN}) implies required ($e_2$)ç available ($e_1$)≠∅

A query plan can now be formally defined as an annotated SPARQL algebraic expression that does not require any variable.

In accordance with an embodiment, a query plan is an annotated SPARQL algebraic expression (e, am, jan) such that required (e)=∅. PL denotes the set of all plans.

Universe of Valid Plans Considered.

For a given query q, the set $EQ_q$ of queries equivalent to q is defined after permuting elements in an AND pattern of the flattened query flat(q). A query $q_1$ is a syntactic reordering of $q_2$, denoted $q_1 \square q_2$, when $q_1$ and $q_2$ are syntactically identical after reordering elements in the AND patterns of $q_1$.

The AND pattern in which an optional pattern op appears in the original query, before flattening, defines the scope of op and the set mand(op) of mandatory variables for the left outer join operation in the algebra. In accordance with an embodiment, it is ensured that an optional pattern is never moved to a position where these mandatory variables are not in scope (or bound). For an AND pattern g=AND ($p_1$, . . . , $p_n$) and an integer 0≤i≤n, inscopevars(g,i) is defined as the set of in-scope variables at the position i of the AND pattern g.

$$inscopevars(g, i) = \begin{cases} \emptyset & \text{if } i = 0 \\ inscopevars(g, i-1) \dot{E} \; inscopevars(p_i) & \text{otherwise} \end{cases}$$

where inscopevars($p_i$) corresponds to the set of in-scope variables of $p_i$ as defined in SPARQL specification section 18.2.1. For an optional pattern op in flat(q) appearing at position pos(op) of an AND pattern g, its set of bound variables, denoted bound(op), is defined as bound(op)=inscopevars pos(op)−1) ç inscopevars(op).

For a given query q, a set of equivalent queries $EQ_q$ is now defined as follows:

$EQ_q$={$q'$|$q'\square$flat($q$)$\dot{U}$ for each optional pattern $op$ in $q'$,mand($op$)$\subseteq$bound($op$)}

The universe of plans considered, $U_q$, is defined as:

$U_q$={$p$=($e$,$am$,$jan$)∈PL|$e$=algebra($q'$)$\dot{U}q'$∈$EQ_q$}

If q consists of a single AND group with n triple patterns, and, for each triple pattern, there are k possible access methods, the cardinality of $U_q$ can be as large as n!$k^n$ (assuming only one implementation for joins and left-joins other than PRODUCT).

The Planning Problem.

In accordance with an embodiment of the present invention, the planning issue is addressed by finding a minimal cost plan p∈$U_q$ for a query q.

Plans in $U_q$ are obtained by considering all permutations of elements in all AND patterns of the flattened query flat(q). To illustrate that the planning problem is NP hard, it is shown that choosing an ordering in a single AND is NP hard.

AND Planning Problem.

In accordance with an embodiment, planning is the process of creating a plan, i.e., a series of plan steps, that covers all the sub-patterns in a single AND node. According to an embodiment, a planning problem is formulated as P (N, M, A, R, C) in terms of access methods (M), available (A) and required (R) variable functions and costs (C), where N is the set of direct subpatterns of a given AND node.

AND Planning Solution.

According to an embodiment, a solution to the planning problem is a graph G of which the nodes $G_N$ are pairs of N×M such that each n∈N occurs exactly once, i.e., |N|=|$G_N$|$\dot{U}$"$_{n∈N}$ $\$_{a∈M}$:n'a∈$G_N$. The edges $G_E$ connect the nodes; an edge $n_1$×$a_1$→$n_2$×$a_2$ is allowed only if A($n_1$×$a_1$)çR ($n_2$×$a_2$)≠∅. For every node n×a, all required variables are provided, i.e., "$_{n×a∈G_N}$ $_{v∈R(n×a)}$$\$_{n_1×a_1∈G_N}$$n_1$×$a_1$→n× a∈$G_E$$\dot{U}$v∈A($n_1$×$a_1$). A topological sort of this graph represents a plan.

Embodiments of the present invention use the cost of G to mean the sum of all node costs, i.e., $\Sigma_{n∈G_N}$C(n). A minimal solution is simply one in which no solution with lower cost exists. A minimal solution is an ideal solution in query planning.

TSP Planning.

The traveling salesperson problem (TSP) is a classic NP-complete problem that requires a salesperson to visit each of a set of cities using the cheapest possible connections and visiting each city exactly once. Formally, a TSP problem can be formulated as a graph T and a cost function C giving a cost for every edge in $T_E$. $C_T$ denotes costs of edges in T. A TSP problem is translated into the planning problem described herein as follows:

$$N \equiv T_N$$

$$M \equiv \{a_{e_1 e_2} \mid e_1 \in T_E \text{ Ù} e_2 \in T_E \text{ Ù} \$_{v, v_1, v_2} : e_1 = v_1 \to v \text{ Ù} e_2 = v \to v_2\}$$

$$A(n, a_{e_1 e_2}) \equiv \begin{cases} v_{e_2} & \$n_1, n_2 : e_1 = n_1 \to n \text{ Ù} e_2 = n \to n_2 \\ \emptyset & \text{otherwise} \end{cases}$$

$$R(n, a_{e_1 e_2}) \equiv \begin{cases} v_{e_1} & \$n_1, n_2 : e_1 = n_1 \to n \text{ Ù} e_2 = n \to n_2 \\ \wedge & \text{otherwise} \end{cases}$$

$$C(n \times a_{e_1 e_2}) \equiv \begin{cases} C_T(e_2) & \$n_i, n_j : e_1 = n_i \to n \text{ Ù} e_2 = n \to n_j \\ ¥ & \text{otherwise} \end{cases}$$

Theorem 1 (AND Planning is NP-Hard).

Finding a minimal solution to the AND planning problem is NP hard.

Proof.

The proof is by reduction from TSP. First, how to solve TSP as a planning problem is shown, and second it is shown that the construction of a planning problem given a TSP problem is polynomial. A minimal solution to the TSP planning problem for graph T is a solution to the original TSP problem, i.e., it denotes a lowest-cost path that covers all the nodes in the original graph exactly once. For each node in T, the possible nodes in the planning problem are $n'a_{e_1 e_2}$ for all possible pairs where $e_1$ is an incoming edge of n and $e_2$ is an outgoing edge of n. Other access methods are not possible since they all require ^ which is not produced. Since exactly one of these nodes must be in the plan solution, it follows that every solution traverses n precisely once. This is true for every such node n, hence any solution must traverse each node exactly once, and hence is a tour. All such paths are permitted since each pair of incident edges for each node is defined as an access method; therefore, the cheapest such path is found by the assumption that planning is not NP hard. Constructing the planning problem from the original graph T is polynomial. The sets V (of variables) and N are linear in the size of T and M is at most quadratic. Hence, planning must be NP-hard by reduction from TSP.

2. Integer Linear Programming Approach

For a query q, the set $U_q$ of plans defined in section 1 is too large for an exhaustive search of an element with the lowest cost. For q with 15 triple patterns and 3 access methods for each triple, assuming enough computing power to generate a billion plans per second, 594 years are needed for the $15! \times 3^{15}$ plans. To solve the query planning problem, embodiments of the present invention cast it as an integer programming problem.

Embodiments of the present invention present a principled and general approach to correctly solve an arbitrary complex query planning problem by casting it into an Integer Linear Programming (ILP) problem. The embodiments include the following steps:

Control-Aware Data Flow Construction.

The access methods applicable to a given triple pattern depend on the variables that are available (in-scope variables) when the triple pattern is evaluated. Since patterns typically share variables, the evaluation of a pattern is often dependent on the evaluation of another pattern. For example, in FIGS. 1A-1D, the triple pattern $t_1$ shares the variable ?x with triple patterns $t_2$ and $t_3$ appearing in the union. Hence, there is an inter-dependency between $t_1$ and the union pattern containing $t_2$ and $t_3$ as, depending on the execution methods used and the order of execution of $t_1$ and UNION($t_2$, $t_3$), the variable ?x may flow from $t_1$ to UNION($t_2$,$t_3$) or in the reverse direction (i.e., a value for variable ?x may be produced by one of and shared between $t_1$ and UNION($t_2$, $t_3$)). The data flow construction step builds a data structure that captures all potentially valid ways in which variables can flow between various parts of the query. This data flow structure is control aware because it explicitly rules out variable flows that would clearly violate the semantics of control statements in the query. For example, the ?y variable shared between $t_2$ and $t_3$ cannot be produced by one and used by the other because it would violate the semantics of a UNION pattern.

Constraint Generation.

In accordance with an embodiment of the present invention, to ensure completeness (i.e., all plans in $U_q$ are considered), the Control-aware Data Flow captures all potentially valid flows and execution orders. The Control-aware Data Flow also contains invalid flows and execution orders that cannot be ruled out a priori. For example, Control-aware Data Flow encodes a cyclic flow of variable ?x from $t_1$ to UNION($t_2$, $t_3$) and from UNION($t_2$, $t_3$) to $t_1$. To ensure soundness (i.e., all solutions of the ILP problem can be converted into a valid plan in $U_q$), the constraint generation step generates, from the control-aware data flow structure, constraints that dynamically rule out all invalid flows and execution orders (e.g., constraints ruling out cyclic data flows). These constraints constitute the linear constraints of the ILP problem formulation.

Cost Function Formulation.

In accordance with an embodiment of the present invention, the cost function is expressed as a linear expression of the various elements of the Control-aware Data Flow structure. It is such that, in an optimal plan, cheaper patterns (in terms of estimated variable bindings) are evaluated first before feeding their bindings to more expensive patterns.

Solving the Resulting ILP Problem.

In accordance with an embodiment of the present invention, using an optimized ILP solver (e.g., IBM® ILOG CPLEX), the ILP problem of minimizing the cost function under the generated set of constraints is solved.

Conversion of an ILP Solution into a Plan.

In accordance with an embodiment of the present invention, an ILP solution is converted into a valid plan in $U_q$ 2.1 Control-Aware Data Flow Construction Building a Control-aware Data Flow for any arbitrary complex graph pattern, in accordance with an embodiment of the present invention, is inspired from electronic circuit design. A Control-aware Data Flow consists of a set of hierarchically nested components. A component c is responsible for the evaluation of an arbitrary complex graph or triple pattern p, which is to the key of c (denoted key(c)). Multiple components may be assigned to the same key. In this case, they represent alternative ways of evaluating their key (e.g., multiple access methods for the same triple pattern).

A component can be viewed from the outside (i.e., its external view) as a black box connected to a set of input pins (one input pin for each variable the component may need to perform its function), and a set of output pins (one output pin for each variable that may become available to other components as a result of its evaluation). Each pin can be in one of two states: activated or deactivated. An activated input pin indicates that its corresponding variable is indeed available to use inside the black box. An activated output pin for a given black box indicates that its corresponding variable is available to other components after the evaluation in the given black box. Likewise, the black box to which input and output pins are connected can be activated (i.e., enabled and performing its function) or deactivated (disabled)). The external view of the component representing a query example has no input pins and produces ?x, ?y, ?z, ?m, ?n.

Internally, a component is responsible for:

1. Wiring external inputs to the inputs of internal sub-components and the wiring of outputs of internal sub-components to inputs of other internal sub-components based on the semantics of the graph pattern type.

2. The exact nature of the wiring is dictated by the semantics of the graph pattern type (e.g., UNION, OPTIONAL, AND, etc.). For example, some components (e.g., UNION) disallow connections between variables of their sub-components (e.g., variable ?y produced by $t_2$ cannot be fed to ?y in $t_3$).

3. Since it is not known a priori the optimal data flow inside a component, embodiments of the present invention consider all potentially valid wirings. However, in a given plan (e.g., solution to a query problem), only a subset of wires will be activated.

According to an embodiment of the present invention, a component is formally defined as follows:

Let V be an infinite set of variables. Let T be a finite set of types. A component C of depth d (for d a positive integer) is a triple (EV, IV, t). t∈T is the type of the component C.

EV, called its external view, is defined as a pair ($G^e$, var) consisting of:
   the directed graph $G^e=(V^e=\text{IP} \dot{\cup} \{bb\} \dot{\cup} \text{OP}, E^e)$ whose set of vertices $V^e$ is a partition of three disjoint sets (the singleton {bb} containing the black box, the set IP of input pins, and the set OP of output pins), and whose set of edges $E^e$ is as follows: $E^e=\{(p,bb)|p\in\text{IP}\} \dot{\cup} \{(bb,p) | p\in\text{OP}\}$. bb is called the black box of the external view EV. Elements of IP (resp. OP) are called input (resp. output) pins of the external view EV. $G^e$ is called the external graph of C.
   the function var maps an element of IP$\dot{\cup}$OP to a variable in V such that if $p_1$ and $p_2$ are in IP (or in OP), then var $(p_1)\neq$var $(p_2)$.

EV is also uniquely characterized by the 4-tuple (IP,bb, OP,var) consisting of input pins, black box, output pins, the variable function. The function input (resp. output) maps a component to its set IP (resp. OP) of input (resp. output) pins. The function blackbox maps a component to its black box.

IV, called the internal view of C, is defined by a pair (SC,$G^i$) consisting of:
   A finite set of components SC. If d=0, then SC=∅ otherwise, SC is made of components $C_k$ of depth $d_k$ such that $0 \leq d_k < d$ and there is a component $C_j \in$ SC whose depth $d_j=d-1$. Elements of SC are called sub-components of C.
   A graph $G^i=(V^i,E^i)$, called internal graph of C and representing all potentially valid data flows inside C, such that:
      The set $V^i$ of internal vertices consists of vertices in all external graphs of sub-components of $$C: V^i = \{n | n \in V_k^e \dot{\cup} EV_k = (G_k^e = (V_k^e, E_k^e), \text{var}_k) \dot{\cup} C_k = (EV_k, IV_k, t_k) \in SC\}.$$

The set $E^i$ of internal edges contains all edges in all external graphs of sub-components of $$C: S = \left\{ (n|n') | (n | n') \in E_k^e \dot{\cup} EV_k = \begin{pmatrix} G_k^e = (V_k^e, E_k^e), \text{var}_k \dot{\cup} C_k = \\ (EV_k, IV_k, t_k) \in SC \end{pmatrix} \right\} \dot{\cup} E^i$$

If $(n,n') \in E^i$ does not belong to the external graph of any sub-component of C (i.e., $(n,n') \in S$, then it must be an edge between an output pin n in the external view of a sub-component $C_k$ and an input pin in the external view of a sub-component $C_j$ such that $C_k \neq C_j$ and n and n' are associated with the same variable (i.e., $\text{var}_k$ (n)=$\text{var}_j$(n')).

The function internalGraph maps a component to its internal graph $G^i$. The function subcomp maps a component to its internal sub-components SC.

In accordance with an embodiment of the present invention, in the internal view (SC,$G^i=(V^i,E^i)$) of a component C, a sub-component $P_1=(EV_1=(IP_1,bb_1,OP_1),IV_1,var_1)$ is called a potential predecessor of a component $P_2=(EV_2=(IP_2,bb_2,OP_2),IV_2,var_2)$ iff. an output pin of $P_1$ is connected to an input pin of $P_2$ (i.e., there is $(op_1,ip_2)\in E^i$ such that $op_1 \in OP_1$ and $ip_2 \in IP_2I$).

If $P_1$ is a potential predecessor of $P_2$, then, in the internal view of $P_2$, there is a special component $P_1$' of type PROXY, whose external view has no input variables and has as many output variables as $P_1$. $P_1$' represents $P_1$ inside the internal view of $P_2$. A delegator function maps each sub-component of type PROXY of a component $P_2$ to the unique potential predecessor of $P_2$ it represents.

A component C of type PROXY is a direct proxy iff. delegator(p) is not of type PROXY.

Referring to FIG. 4, Algorithm 1, invoked with a graph pattern GP to evaluate an empty set of potential predecessors, builds components responsible for the evaluation of GP (i.e., components representing alternative evaluation strategies for GP).

The definition of a component and Algorithms 1 and 2 (see FIGS. 4 and 5) are illustrated herein in the running example. FIG. 2 shows the internal sub-components of the top level component responsible for the evaluation of the main pattern of the query. There are three components associated with each triple pattern; one for each access method (aco, acs and scan) (see lines 4-12 of Algorithm 1). These components have the same key and each component corresponds to a different access method for the triple. The UNION (resp. OPTIONAL) component in the figure is associated with the pattern UNION(t2, t3) (resp. OPTIONAL(t7).

FIG. 2 shows the three components for triple patterns $t_1$, $t_4$, $t_5$ and $t_6$ at blocks 201, 203, 205 ($t_1$), 211, 213, 215 ($t_4$), 221, 223, 225 ($t_5$), 231, 233, 235 ($t_6$), the UNION component 241 for triple patterns $t_2$ and $t_3$ and an OPTIONAL component 251 for triple pattern $t_7$. Triple access methods that do not require any variables (e.g., ($t_1$,aco)) only have as output variables their produced variables. The triple access methods that do not require any variables are potential independent starting points of the evaluation and do not depend on any other components. However, in an AND pattern, a sub-component c that may need at least one variable (e.g., ($t_1$,acs)) has as output pins all in-scope variables occurring in the AND pattern. This is needed because its required input variables may be provided by another sub-component d (corresponding to a join or left join with d) and d may have available after its evaluation variables not produced by c, which will also remain available after c's evaluation and should, therefore, appear in the set of potential output variables of c. In addition to sub-components responsible for the evaluation of each sub-pattern of the main pattern, FIG. 2 shows special components: one product component 261 and five join components 271. A product component represents a product operation performed on the two components connected to its input pins, whereas a join component corresponds to a regular join performed on the two components connected to its input pins. Since the top pattern has 6 sub-patterns with two join variables (x and y), there can be at most 5 (6−1) regular joins and 1 (2−1) product (construction of join and product components is done in lines 18-26 of Algorithm 2). FIG. 2 shows all potential connections to the x input pin of the component ($t_1$,acs) (dotted lines) and all potential connections to the x input pin of the UNION component (continuous lines). In the internal view of a component associated with an AND group, for each variable x, all output pins corresponding to a variable x are connected to all input pins corresponding to x (see lines 29-33 of Algorithm 2).

Figure 3:
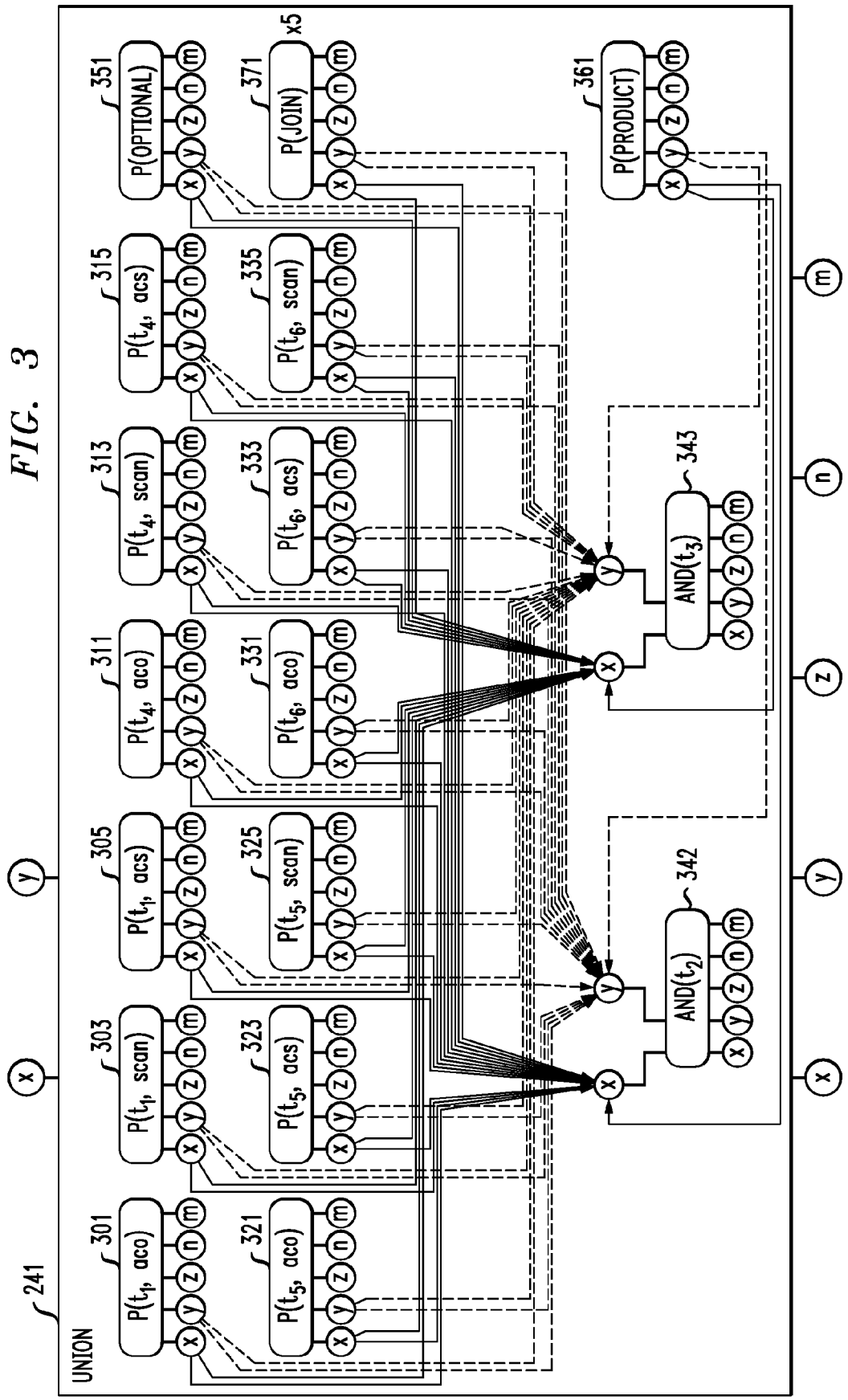
FIG. 3 illustrates an internal view of the union component, whose external view is present in the internal view of the top level component of FIG. 2, according to an exemplary embodiment of the present invention.

FIG. 3 shows an internal view of the union component 241, whose external view is present in the internal view of the top level component of FIG. 2. The first three rows of its sub-components (from the top) include proxy components for triple patterns $t_1$, $t_4$, $t_5$ and $t_6$ at blocks 301, 303, 305 ($t_1$), 311, 313, 315 ($t_4$), 321, 323, 325 ($t_5$), 331, 333, 335 ($t_6$), a proxy component P(OPTIONAL) 351 for triple pattern $t_7$, a proxy component P(PRODUCT) 361, and a proxy component P(JOIN) 371.

A proxy component pp in the internal view of a component c is a special component that stands for another component p that may be connected to an input pin of c. The proxy pp serves two primary functions. First, it maintains the grouping of variables produced by p, such that the correct sets of variables can be activated in the output pins of c. As an example, consider the component ($t_5$, aco) in the optimal query flow shown in FIG. 1D. ($t_6$, acs) is its single predecessor, which has a wiring to ($t_5$, aco) through y. In the optimal query flow shown in FIG. 1D, since ($t_6$, acs)'s output pins for x, y, and n are active, it is known that for the component ($t_5$, aco), its output pins will be active not only for y, but for n and x as well. The proxy component therefore serves a book-keeping purpose, which is to help maintain groups of variables that have to be active in a specific query flow. A second purpose of the proxy component is to specify which of the active predecessors of a component c are immediate predecessors in a given query flow. In the same example, only the proxy component for ($t_6$, acs) is marked as active in the internal view for ($t_5$, aco), although other potential predecessors (based on all potentially valid connections) such as the UNION are active in the flow. That is, the proxy captures the immediate predecessors of a component c within the flow.

Two sub-components 342 and 343 (AND ($t_2$) and AND ($t_3$)) for triple patterns $t_2$ and $t_3$, called child components, are responsible for the evaluation of the two sub-patterns of the union pattern. FIG. 3 shows all connections between the external view of all sub-components of the UNION component (Lines 13-15 of Algorithm 2) (continuous lines for x flows and dotted lines for y flows). As opposed to the internal view for an AND component, the connections in the internal view of a UNION component are limited to connections from proxy components to child components.

2.2 Constraint Generation

As mentioned above, not all data flows captured by components built by Algorithm 1 are valid. Embodiments of the present invention provide a set of constraints to rule out invalid flows.

Decision Variables and Candidate Solutions.

Given a set of components C responsible for the evaluation of a pattern GP, the function $\alpha$, referred to as the decision variable function, maps each vertice n (resp. edge ($n_1$,$n_2$)) in the external or internal graphs of components in C and their direct and indirect sub-components to a unique boolean variable $\alpha(n)$ (resp. $\alpha((n_1,n_2))$) that indicates whether n (resp.($n_1$,$n_2$)) is activated. The range of $\alpha$, denoted range ($\alpha$), contains all the decision variables associated with C. A candidate solution is a function $\delta$ from range (a) to $\{0, 1\}$. It assigns an activation state (0 or 1) to each vertice and edge of components directly or indirectly contained in C. Given a candidate solution $\delta$ and a set of components C, the corresponding candidate component solution, denoted D (C), is the set of components obtained by retaining only activated vertices and edges (i.e., elements of the set ACT=$\alpha^{-1}(d^{-1}(\{1\}))$). It is defined as follows:

$D(C)=\{c|d(\alpha(blackbox(c)))=1 \cup c' \in C s.t.\ blackbox(c)$
$=blackbox(c') \cup$ $input(c)=input(c') \varsigma ACT \cup output(c)=output(c') \varsigma ACT$
$\cup$ $subcomp(c)=D(subcomp(c')) \cup ig=internalGraph(c)$
$\cup ig'=internalGraph(c') \cup$ $vertices(ig)=vertices(ig') \varsigma ACT \cup$ $edges(ig)=\{(v,v') \in edges(ig')|d(\alpha(v))=1 \cup d(\alpha(v'))=1 \cup d$
$(\alpha((v,v'))=1\}\}$ FIG. 1D shows the internal view of the top level component 109 for an optimum component solution D(C). As can be seen, the top level component 109 includes the components a-f used in the optimal query flow, and output pins for variables x, y, z, n and m. This solution corresponds to the right hand plan 107 shown in FIG. 1C.

Constraint Definition and Classification.

For a query q, whose main graph pattern is GP, and for C returned by Algorithm 1, most candidate solutions d are invalid in the sense that the corresponding candidate component solutions D (C) cannot be converted into a valid plan in $U_q$ (e.g., if D(C) still contains cyclic data flows). Embodiments of the present invention provide constraints to rule out invalid candidate solutions. In accordance with an embodiment of the present invention, a constraint is a logical expression written as a function of decision variables that expresses a relation that must hold for all valid candidate solutions. A constraint is expressed as a linear inequality of the form: $a_0'x_0+ \ldots +a_k'x_k^3$ b or $a_0'x_0+ \ldots +a_k'x_k £b$, where k is a positive integer, and, for $0 £ i £ k$, $a_i$ and b are real number constants and $x_i$ are decision variables. In accordance with an embodiment of the present invention, constraints fall in one of the following categories: generic component constraints, generic graph constraints, predecessor constraints, output pin constraints, and component-type specific constraints.

Generic Component Constraints.

Generic component constraints are applicable to the external view of every component. They enforce the semantics of an external view as defined herein.

(C1) If a black box bb is not activated (i.e., $\alpha(bb)=0$), then each of its input or output pin p is also deactivated (i.e., $\alpha(p)=0$):$\alpha(p) £ \alpha(bb)$)

(C2) A pin p is connected to its black box bb iff. it is activated:

(C2-a) For p an input pin: $\alpha((p,bb))=\alpha(p)$ (C2-b) For p an output pin: $\alpha((bb,p))=\alpha(p)$ (C3) In the internal view of a component c, whose internal graph is G=(V,E), if an input pin ip of a sub-component sc of c is activated, then it must have at least one activated incoming edge: $\Sigma_{(op,ip) \in E} \alpha((op,ip))/\alpha(ip)$ (C4) Each key k (query fragment) must be executed exactly once:

$$\sum_{c.s.t.\ key(c)=k} \alpha(blackbox(c)) = 1$$

Components of types JOIN, PRODUCT, and PROXY are not associated with any key, so this constraint does not apply to them.

Generic Graph Constraints.

Generic Graph constraints enforce proper data flow semantics.

(C5) If an edge (n,m) is activated, then nodes n and m must also be activated:

$$\alpha(n)+\alpha(m)³2'\alpha((n,m))$$

(C6) The internal graph G=(V,E) of a component c must be acyclic. For each vertice v∈V, v is mapped to a new integer decision variable representing its position, denoted pos(v) and such that 0£pos(v)£|V|−1 (where |V| denotes the cardinality of the set V). The position associated to each vertice introduces an implicit ordering that is used to informally express the acyclicity constraint as follows: if an edge (n,m) is activated, then pos(n)+1£pos(m) (i.e, pos(n)<pos (m)). The formal ILP acyclicity constraint is expressed as follows for an edge (n,m)∈E:

$$pos(n)+1+(|V|'(\alpha((n,m))-1))£pos(m)$$

Note that if (n,m) is activated (i.e., $\alpha((n,m))=1$), the previous constraint becomes what was wanted (i.e, pos(n) <pos(m)); otherwise, it is always satisfied as pos(n)+1−|V|£0 (by definition of pos(n)) and pos(m) is a positive integer.

Predecessor Constraints.

These constraints enforce the semantics of potential predecessors as defined herein and additional constraints to ensure that every valid solution can be converted in a valid plan in $U_q$.

(C7) In the internal view of a component $c=(EV_c=(IP_c, bb_c, OP_c, var_c), IV_c, t_c)$, the proxy component pp representing a potential predecessor p of c (i.e., delegator(pp)=p) is activated iff. at least one of the output pins of p is connected to one of the input pins of c. Let $EV_p=(IP_p, bb_p, OP_p, var_p)$ be the external view of the potential predecessor p of c and let IV=(SC,G=(V,E)) be the internal view of the component d that has both c and p as its sub-components (i.e., c and p are in SC), the formal ILP constraint is as follows[2]:

$$\alpha(blackbox(pp)) = \max_{(op,ip)\in E\ s.t.\ op\in OP_p, ip\in IP_c} \alpha((op, ip))$$

(C8) As explained in section 2.4, in the translation of the solution to the ILP problem into a plan in $U_q$, a predecessor of c that is not of type PROXY is joined (or left joined) with c, whereas as predecessor of type PROXY, simply allows already bound variables to be used in access methods of inside c. Since join operators in plans in $U_q$ have exactly two operands, the maximum number, M, of direct proxies dp (i.e., delegator(dp) is not of type PROXY) that an activated component can have is limited to 1 (except for components of type JOIN and PRODUCT that must have exactly two direct proxies). Let S be the linear expression of the number of activated direct predecessor proxies of a component c:

[2] A constraint with min and max can be translated into a standard linear constraint, and most ILP solvers directly support standard linear constraints.

$$S = \sum_{pp\in subcomp(c)\ Utype(pp)=PROXY\ Utype(delegator(pp))\neq PROXY} \alpha(blackbox(pp))$$

(C8-a) M is equal to 1 for all components except join and product components for which it is equal to 2. S£M'α(blackbox(c))

(C8-b) The minimum number, m, of direct predecessor proxies is 0 for all components except join and product components for which it is 2. S³m'α(blackbox(c))

(C9) A component p provides the value of a variable x to a component c with at least one non-proxy sub-component (i.e., p's x output pin is connected to c's x input pin) iff. the x output pin of the predecessor proxy pp representing p in c is connected to another sub-component of c. This constraint ensures that variables provided by predecessors are indeed used by sub-components. Let op be the output pin of p for variable x. Let ip be the input pin of c for x. Let G=,E) be the internal graph of c and let op' be the output pin for x of the proxy pp.

The formal ILP constraints are expressed as follows:

$$|\{(op',v)|(op',v)\in E\}|\times\alpha((op,ip))³\Sigma_{(op',v)\in E}\alpha((op',v)) \quad (C\text{-}9a)$$

$$\alpha((op,ip))£\Sigma_{(op',v)\in E}\alpha((op',v)) \quad (C9\text{-}b)$$

Note these constraints do not apply to components without non-proxy sub-components such as join, product, proxy and simple triple access method components.

(C10) The activation status of output pins are identical in an activated proxy and the potential predecessor it represents. Let pp be a proxy representing a component p (i.e., delegator(pp)=p), for each variable x in the set of output variables of p, let $op_x$ be the output pin of p associated with x and let $op_x'$ be the output pin of pp associated with x:

$$\alpha(op_x)+(\alpha(blackbox(pp))-1)£\alpha(op_x') \quad (C10\text{-}a)$$

$$\alpha(op_x')+(\alpha(blackbox(pp))-1)£\alpha(op_x) \quad (C10\text{-}b)$$

Output Pin Constraints.

These constraints control the default activation of output pins of components. A variable is available after the execution of a component c whose type is different from PROXY iff. it is either an in-scope variable of the graph pattern associated with c ((C11)) or it is a variable provided by a direct predecessor ((C12)). Note the activation status of proxy component is controlled by constraints (C10)[3].

[3] The implementation of a Minus component also overrides these default activation constraints (C11) If a non-proxy component c, responsible for the evaluation of a graph pattern GP (i.e., key(c)=GP), is activated, then all the output pins of c associated with in-scope variables of GP must be activated (as these variables are available after the execution of c). Let op be an output pin of c for a variable x∈inscopevars(GP): $\alpha(op)³\alpha(blackbox(c))$ (C12) Let op be an output pin for a variable x of a non-proxy component c that is either associated with no keys (e.g., join or product) or associated with a graph pattern GP s.t. x∉inscopevars(GP). op is activated iff. at least one direct predecessor proxy pp in the internal view of c has an activated output pin associated with x.

$$\alpha(op) = \max_{op'\in output(pp)\ Upp\in subcomp(c)\ UisDirectProxy(pp)} \alpha(op')$$

where isDirectProxy(pp) is defined as isDirectProxy(pp)= (type(pp)=PROXY) Ù (type(delegator(pp))≠PROXY).

Component-Type Specific Constraints.

These constraints are applicable to components of a specific type.

(C13) An activated component c=(EV=(IP,bb,OP,var),IV, acm) associated with a triple pattern tp=key(c) (i.e., c's type acm is in the set of access methods M) must have all its input pins corresponding to required variables of the access method acm activated. For x∈R (tp,acm) and ip∈ IP s.t. var (ip)=x, α(ip)³α(blackbox(c)).

(C14) Plans in $U_q$ are rooted trees. For a component c of type AND whose internal graph is G=(V,E), let G'=(V',E') be the inverse of G restricted to the set SC' of non-proxy sub-components with at least one input pin or one output (i.e., SC'={sc|sc∈subcomp(c)Ù type(sc)≠PROXY Ù input (sc) Ė output(sc)≠∅}). To ensure that a valid ILP candidate solution can be translated into a rooted tree, G' must be a rooted tree. This constraint is enforced by the following two specific constraints:

(C14a) A sub-component in the internal view of c is defined as a sink iff. it is activated and has no outgoing edges. There must be at most one sink in the set SC':

$$\sum_{sc \in SC'} \left( \alpha(blackbox(sc)) - \max_{(op,ip) \in E \text{ s.t. } op \in output(sc)} \alpha((op, ip)) \right) £1$$

(C14b) A sub-component of sc∈SC' f c can have activated outgoing edges to at most other sub-component of c (i.e., there is at most one activated predecessor proxy pp s.t. delegator(pp)=sc across internal views of all sub-components of c). Formally, for sc∈SC', $$\sum_{\substack{pp \in subcomp(s) \grave{U} \ s \in subcomp(c) \\ \grave{U}type(pp)=PROXY \grave{U}delegator(pp)=sc}} \alpha(pp) £1$$

(C15) The two activated predecessors of a merger component c (i.e., a component of type JOIN or PRODUCT) must have at least one activated output variable in common if the type of c is JOIN; otherwise (i.e., type(c)=PRODUCT), they should have no activated output variable in common. The expression CV that indicates whether the predecessors of c have a common variable is introduced, and then used to express merger component constraints. To define CV, for each variable x associated with an input pin of c, a new boolean decision variable $CV_x$ is introduced. $CV_x$ indicates whether all the direct proxies in the internal view of c have x as a common variable. $CV_x$ satisfies the following two constraints: $CV_x{}^3 S_x - 1$ and $S_x{}^3 2 CV_x$, where $S_x$ is the following expression indicating the number of direct proxies in c that have an activated output pin associated with x:

$$S_x = \sum_{\substack{pp \in subcomp(c) \\ \grave{U}isDirectProxy(pp)}} \begin{cases} \alpha(op) & \text{if } op \in output(pp) \\ & \grave{U}var(op)=x \\ 0 & \text{otherwise} \end{cases}$$

Since a merger component has exactly two activated direct proxies (see constraints (C8a) and (C8b)), the first constraint on $CV_x$ ensures that if x is a variable common to all predecessors, then $CV_x=1$, and the second constraint ensures that if $CV_x=1$, then x is a variable common to all predecessors.

$$CV = \max_{x|\$ip \in input(c) s.t. var(ip)=x} CV_x$$

(C15a) For c is a component of type JOIN: $CV^3\alpha(blackbox(c))$ (C15b) For c is a component of type PRODUCT: $(1-CV)^3\alpha(blackbox(c))$ (C16) Plans in $U_q$ are such that join or product operations have at most one operand that is either a join, product or left outer join operation. In our translation of a solution into a valid plan in $U_q$ (see section 2.4 for more details), a join operation can be introduced in a plan through the translation of an explicit join component or when a component c has as a predecessor a non-proxy component p (this results in translation of c as a join between a translation of p and a translation of the internal view of c). Thus, to be able to convert an ILP solution into a plan in U, embodiments of the present invention ensure that a join or product component has at most one non-proxy predecessor p such that p itself has non-proxy predecessors. For a component c, the expression hasNPP (c) indicates whether c has at least one non-proxy predecessor: if c has no direct proxy sub-component hasNPP (c)=0; otherwise, hasNPP (c)=$\max_{pp \in subcomp(c) \grave{U} isDirectProxy(pp)} \alpha(blackbox(pp))$.

For a component c of type JOIN or PRODUCT, the constraint can now be formally expressed as:

$$\sum_{\substack{pp \in subcomp(c) \grave{U}isDirectProxy(pp) \\ \grave{U}delegator(pp)=p}} \min(\alpha(blackbox(pp)), hasNPP(p)) £1$$

The remaining three constraints enforce the proper semantics of an optional pattern and the left join operation it is translated into (see section 2.4 for more details about the translation of optional components).

(C17) In accordance with an embodiment of the present invention, an activated direct proxy pp in the internal view of a component c of type OPTIONAL must have all the mandatory variables of the optional pattern key(c) associated with c activated in its output. Let pp be a direct proxy sub-component of c, (C17a) if pp output variables do not contain all mandatory variables of key(c) (i.e., mand(key(c))İ/vars(output (pp))), then α(blackbox(pp))=0

(C17b) otherwise (i.e., mand(key(c))İ vars(output(pp)));

$$\sum_{\substack{x \in mand(key(c)) \\ \grave{U}op \in output(pp) \\ \grave{U}var(op)=x}} \alpha(op)^3 \alpha(blackbox))'|mand(key(c))|$$

(C18) If an activated component c of type OPTIONAL has no non-predecessor proxies, then it must be a predecessor of a component j of type JOIN. Let G=(E,V) be the internal graph of the component d that has c as one of its sub-components.

$$\sum_{\substack{j \in subcomp(d) \\ \dot{\cup} j = (EV, IV, JOIN) \\ \dot{\cup} EV = (IP, bb, OP, var)}} \max_{\substack{(op, ip) \in E \\ s.t.\ op \in output(c) \\ \dot{\cup} ip \in IP}} \alpha((op, ip))^3 (\alpha(\text{blackbox}(c)) - hasNPP(c))$$

where hasNPP (c) is defined in (C16)

(C19) A join component c can have at most one predecessor p of type OPTIONAL such that p has no non-proxy predecessors.

$$\sum_{\substack{pp \in subcomp(c) \dot{\cup} \\ isDirectProxy(pp) \dot{\cup} delegator(pp) = p}} \min(\alpha(\text{blackbox}(pp)), hasNPP(p)) \pounds 1$$

(C20) If a join component c has a predecessor $p_1$ of type OPTIONAL such that $p_1$ has no non-proxy predecessors, then the other predecessor $p_2$ must have all the mandatory variables of the optional pattern key($p_1$) associated with $p_1$ activated on its output pins. This constraint is formally expressed as follows. Let $pp_1$ be a proxy sub-component of a join component c such that delegator($pp_1$) and type($p_1$) =OPTIONAL, and let $pp_2$ be any other direct proxy sub-component of c different from $pp_1$:

(C20a) if $pp_1$ output variables do not contain all mandatory variables of key($p_1$) (i.e., mand(key($p_1$))Í/vars (output($pp_2$))), then $\alpha(\text{blackbox}(pp_2))=0$ (C20b) otherwise (i.e., mand(key($p_1$)) Í vars(output ($pp_2$)))

$$\sum_{\substack{x \in mand(key(p_1)) \\ \dot{\cup} op \in output(pp_2) \\ \dot{\cup} var(op) = x}} \alpha(op)^3 \alpha(\text{blackbox}(pp_2)) \times |mand(key(p_1))|$$

2.3 Cost Function Formulation

For each component c, embodiments of the present invention associate a new positive real number variable, denoted cost(c), for the cost of c. The cost structure of a component c whose type is different from PROXY is defined as:

$$cost(c) = 1_0 + \sum_{\substack{sc \in subcomp(c) \\ \dot{\cup} type(sc) \neq PROXY}} 1'_{sc} cost(sc) + \sum_{\substack{sc \in subcomp(c) \\ \dot{\cup} isDirectProxy(sc)}} 1''_{sc} cost(sc)$$

where $1_0$, $1_{sc}$, and $1_{sc}'$ for sc∈subcomp(c) are positive real number constants whose values depend on the type of c and its sub-components.

For example, for a component c associated with a triple pattern (i.e., key(c) is a triple pattern with the access method acm∈M, $1_0$ is the cost of evaluating the triple pattern key(c) using access method acm.

For a component c of type PROXY representing a component p (i.e., delegator(c)=p), 1. if c is activated, then cost(c)=cost(p). This is expressed using the following two ILP constraints:

$$cost(c) + MAXCOST \times (\alpha(\text{blackbox}(c)) - 1) \pounds\ cost(p) \qquad (a)$$

$$cost(p) + MAXCOST \times (\alpha(\text{blackbox}(c)) - 1) \pounds\ cost(c) \qquad (b)$$

2. if c is not activated, then cost(c)=0, which is expressed using the following ILP constraint: cost(c)−MAXCOST×(α (blackbox(c)))£0 where MAXCOST is an upper bound of the cost of all components. A value of MAXCOST can be computed by conservatively assuming that all components are activated. However, in practice, instead of relying on the previous three linear constraints, an embodiment of the present invention uses explicit then constraints provided by an LP solver such as IBM CPLEX. This avoids numerical instabilities that could occur due to the potentially large value of MAXCOST.

In accordance with an embodiment of the present invention, for a query q whose main graph pattern is GP and such that the invocation of Algorithm 1 with arguments GP and Ø returns a set C of components, the ILP problem to solve is as follows: minimize $\Sigma_{c \in C}$ cost(c) subject to all constraints defined in section 2.2 and cost constraints defined in this section.

2.4 Soundness and Completeness

Before presenting soundness and completeness results, important notations are briefly introduced herein. Let q be a query whose main graph pattern is GP. Let C be the set of components returned by the invocation of Algorithm 1 with arguments GP and Ø. The set Fq denotes the set of constraints generated for C and presented in section 2.2. The set of candidate solutions satisfying all constraints in Fq is denoted $ILPS_q$ For d∈ILPS q, cost(d) is defined as the cost(d)=$\Sigma_{c \in C}$d (cost(c)).

Finally in a plan p∈Uq, for some operators (REGULARJOIN, PRODUCT, and UNION) the order of evaluation of their operands does not affect the total estimated cost.[4] Two plans $p_1$ and $p_2$ are cost equivalent, denoted $p_1\ p_2$, iff one can be transformed into the other by a sequence of applications of a commutative operation com and an associative operation asso operation on REGULARJOIN, PRODUCT, and UNION. For op∈{REGULAR JOIN, PRODUCT, UNION}, com(op ($e_1,e_2$))=op ($e_2,e_1$) and asso(op($e_1$,op($e_2,e_3$)))=op (op)($e_1,e_2(,e_3)$)

[4] Note that this is not the case for a LINEAR JOIN

The soundness and completeness of the ILP approach is established by the following Theorem:

Theorem 2.

Let q be a query whose main graph pattern is GP. There exists a pair of functions (β,σ) such that β is a function from $U_q$ to $ILPS_q$ and σ is a function from $ILPS_q$ to $U_g$ such that:

1. if p∈$U_q$, then σ(β(p))≈p
2. if d∈$ILPS_q$, then cost(β(σ(d)))=cost(d)

Proof.

Referring to FIG. 7, algorithm 4 shows a concrete implementation of β which converts a plan in $U_q$ into a candidate solution in $ILPS_q$.

Referring to FIG. 6, algorithm 3 shows a concrete implementation of σ which converts a candidate solution in $ILPS_q$ into a plan in $U_q$. For REGULARJOIN, PRODUCT, and UNION, whose order of evaluation of operand does not affect the total estimated cost, the plan produced by σ is such that operands with lower estimated cost are evaluated first (due to sorting in increasing cost performed at lines 6, 16, and 36).

Properties (1) and (2) are satisfied by (β,σ) because (a) β is such that if $p_1$ and $p_2$ in $U_q$ and β($p_1$)=β($p_2$) then $p_1$≈$p_2$, and (b) two distinct candidate solutions $d_1$, $d_2$ in $ILPS_q$ are mapped to the same plan p only when they differ by the proxy predecessors predecessors of type PROXY) used to access already bound variables, and (c) proxy predecessors result in indirect proxies in the internal view of their successors (which are not costed—see section 2.3).

Experimental Examples

The effectiveness of the ILP based planner as a testing framework was examined by conducting experiments with 5 different benchmarks:
Guo, Y., Pan, Z., Heflin, J.: "LUBM: A Benchmark for OWL Knowledge Base Systems, Journal of Web Semantics pp. 158-182 (2005) Vol. 3, No, 2-3 ("LUBM");
Schmidt, M., Hornung, T., Lausen, G., Pinkel, C.: "SP2Bench: A SPARQL Performance Benchmark," CoRR abs/0806.4627 (2008) ("SP2Bench");
Morsey, M., Lehmann, J., Auer, S., Ngonga Ngomo, A "DBpedia SPARQL Benchmark—Performance Assessment with Real Queries on Real Data," In: ISWC 2011 (2011) ("DBpedia");
Ma, L., Yang, Qiu, Z., Xie, G., Pan, Y., Liu, S.: "Towards a Complete Owl Cntology Benchmark," In: Proceedings of the 3rd European Conference on the Semantic Web: Research and Applications. pp. 125-139. ESWC706, Springer-Verlag, Berlin, Heidelberg (2006), http://dx-.doi.org/10.1007/11762256_12 ("UOBM"); and
a private benchmark ("PRBench") used in earlier benchmarking work—Bornea, M., Dolby, J., Kementsietsidis, A., Srinivas, K., Dantressangle, P., Udrea, O., Bishwaranjan, "B.: Building an Efficient RDF Store Over a Relational Database," in: Proceedings of the ACM SIGMOD Conference (SIGMOD) (2013).

It was determined whether the ILP based planner could be used to test the greedy approach outlined in the DB2RDF system, given that this is one relatively mature implementation of a greedy approach to SPARQL planning. The evaluation of the ILP testing framework in accordance with embodiments of the present invention: (1) demonstrated that the framework can actually compute optimal plans for a wide variety of queries; and (2) determined that the framework could be used to uncover optimization opportunities in a relatively mature planner.

Figures 8, 9:
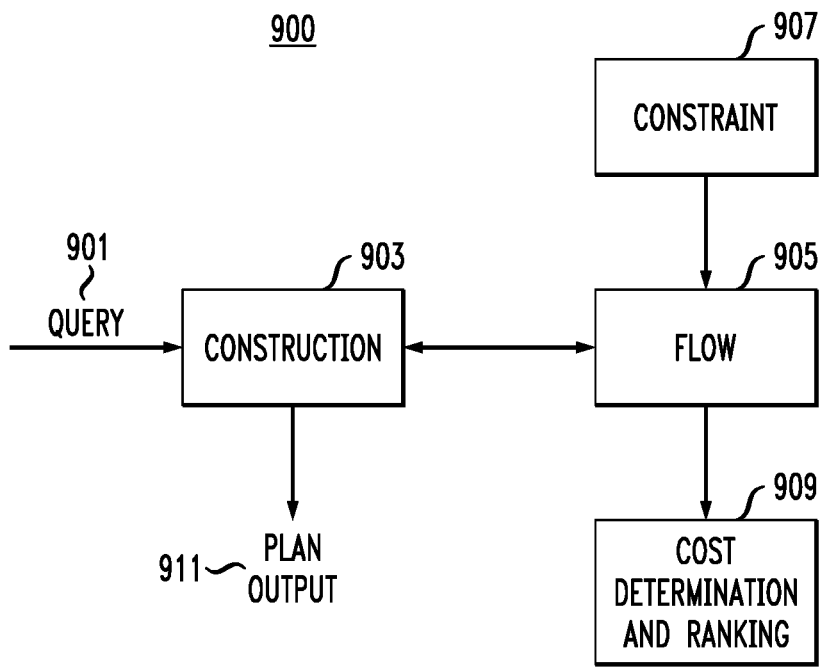
FIG. 8 is a table showing a summary of ILP results for 5 benchmarks in connection with experimental data taken when using embodiments of the present invention.
FIG. 9 illustrates a system for optimizing a query, in accordance with an embodiment of the present invention.

Referring to FIG. 8, Table 1 shows a summary of the ILP results on the 5 benchmarks. As shown in the table, the average time for query planning of all 91 queries indicates that the ILP approach in accordance with embodiments of the present invention is very practical for testing SPARQL planners. Further, as shown in the Figure, the ILP approach in accordance with embodiments of the present invention helped identify 7 cases where the greedy plans were suboptimal. For at least one of those cases, the ILP planner's optimal plan helped identify obvious opportunities for improving the greedy algorithm. Specifically, the greedy planner in DB2RDF missed opportunities for exploiting star queries (i.e., queries on the same entity) due to heuristics that did not adequately reflect the performance gain from stars. Once the optimal plans highlighted the problem, the greedy planner was able to be tuned with better heuristics and verify that these new heuristics made that plan optimal. In the other 6 cases, it was quite clear that any greedy approach would arrive at a suboptimal plan.

FIG. 9 illustrates a system for optimizing a query, according to an exemplary embodiment of the present invention. The system 900 includes a construction module 903 capable of building a data structure for a query 901. In accordance with an embodiment, the data structure includes a plurality of components, wherein each of the plurality of components corresponds to at least one graph pattern. Graph patterns can include, for example, triple patterns and/or operations on more than one triple pattern.

The system also includes a flow module 905 capable of determining a plurality of flows of query variables between the plurality of components in the data structure, and a cost determination and ranking module 909 capable of determining a combination of the plurality of flows between the plurality of components that results in a minimum cost to execute the query 901.

The system 900 further includes a constraint module 907 capable of ruling out one or more flows that would violate semantics of one or more control statements in the query 901. The constraint module 907 is capable of generating one or more constraints for ruling out the invalid flows of the plurality of flows. The one or more constraints can be expressed as a function of decision variables, and can comprise, for example component constraints enforcing semantics of an external view of one or more of the components, graph constraints enforcing semantics of the plurality of flows of query variables, and predecessor constraints enforcing semantics of one or more potential predecessors.

In the system 900, a component can represent an access method (e.g., scan, aco, acs) for a graph pattern. A component may include at least one proxy component representing another component that is connected to a query variable input of the component. The cost determination and ranking module 909 may determine the minimum cost as a function of one or more access methods for evaluating each graph pattern. Based on its inputs from the flow module 905 and the cost determination and ranking module 909, the construction module 903 outputs an optimal query plan that includes the combination of the plurality of flows between the plurality of components that results in the minimum cost to execute the query.

The system 900 can further include an integral linear programming (ILP) solver. The cost determination and ranking module 909 can use the ILP solver to solve a linear optimization problem of determining the combination of the plurality of flows between the plurality of components that results in the minimum cost under the one or more constraints generated by the constraint module 907. According to embodiments of the present invention, the ILP solver can be a stand-alone module, or part of another module, such as the cost determination and ranking module 909.

Figure 10:
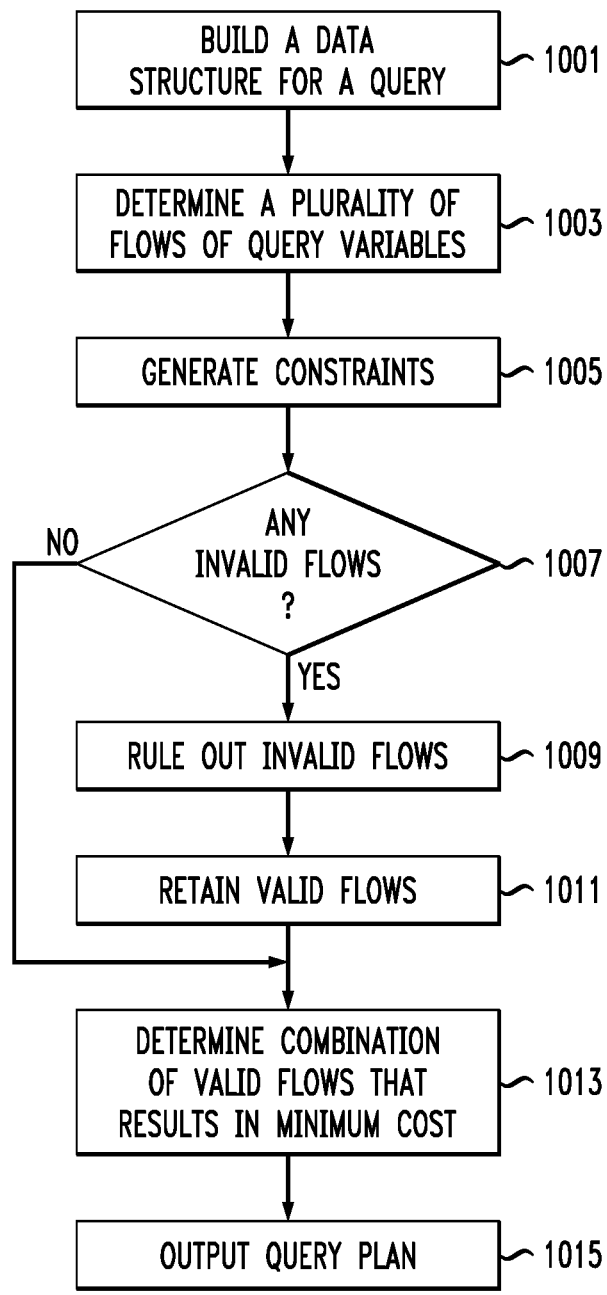
FIG. 10 illustrates a method for optimizing a query, in accordance with an embodiment of the present invention.

FIG. 10 illustrates a method for optimizing a query, according to an exemplary embodiment of the present invention. The method 1000 includes building a data structure for a query (block 1001). In accordance with an embodiment, the data structure includes a plurality of components, wherein each of the plurality of components corresponds to at least one graph pattern. At block 1003, a plurality of flows of query variables between the plurality of components are determined, and at block 1007 it is determined whether any flows of the plurality of flows are invalid. Flows determined to be invalid are ruled out at block 1009, and valid flows are retained at block 1011. A flow is determined to be invalid if the flow, for example, would violate semantics of one or more control statements in the query. The method may include generating one or more constraints (block 1005), which can be used when determining whether or not a flow is invalid and should be ruled out. The one or more constraints can be expressed as a function of decision variables, and can include, for example, component constraints enforcing semantics of an external view of one or more of the components, graph constraints enforcing semantics of the plurality of flows of query variables, and predecessor constraints enforcing semantics of one or more potential predecessors.

When there are no invalid flows or all invalid flows have been removed, the method advances to determining a combination of the valid flows between the plurality of components that results in a minimum cost to execute the query (block 1013). The minimum cost can be a function of one or more access methods for evaluating each graph pattern. At block 1015, the combination of valid flows between each of the plurality of components resulting in the minimum cost is output as the optimized query plan. According to an embodiment, depending on the complexity of the query, or how often the query is to be run, the determining step at block 1013 may optionally be performed within a predetermined time limit, and the combination with the lowest cost upon expiration of the predetermined time will be deemed the optimized query plan. For example, it may be deemed worthwhile to put a time limit on the determination of an optimal query plan if the query is to be run a small number of times, or there are other circumstances where it would be deemed more efficient to reduce the time taken for optimizing the query plan.

According to an embodiment, the method 1000 may further include using an integral linear programming (ILP) solver to solve a linear optimization problem of determining the combination of the plurality of flows between the plurality of components that results in the minimum cost under the one or more generated constraints.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-10 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 11:
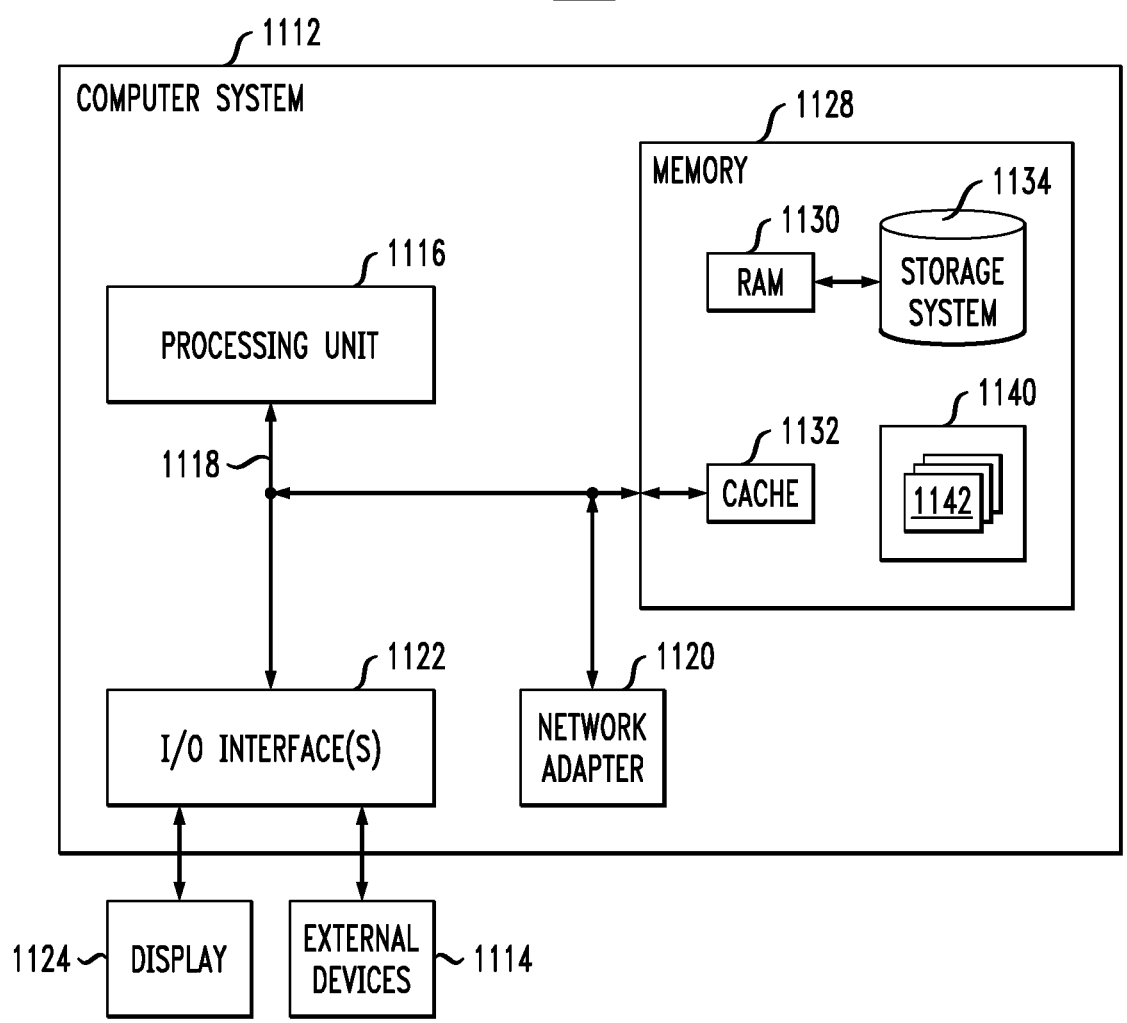
FIG. 11 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 11, in a computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

The bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1112 typically includes a variety of computer system readable media. Such media may be any available media that is accessible by computer system/server 1112, and it includes both volatile and non-volatile media, removable and non-removable media.

The system memory 1128 can include computer system readable media in the form of volatile memory, such as random access memory (RAM) 1130 and/or cache memory 1132. The computer system/server 1112 may further include other removable/non-removable, volatile/nonvolatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1118 by one or more data media interfaces. As depicted and described herein, the memory 1128 may include at least one program product having a set (e.g., at least one) of program modules that are configured to carry out the functions of embodiments of the invention. A program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc., one or more devices that enable a user to interact with computer system/server 1112, and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

Embodiments of the present invention address the optimal SPARQL query planning problem, in the context of offline query optimization and planner testing, formally introduce a universe of alternative query plans for an input query q, and prove that the planning problem for this universe in NP-hard. To efficiently solve the planning problem, embodiments of the present invention cast the planning problem as an ILP problem. Experiments were conducted with well-known datasets and large numbers of queries and illustrated that the embodiments of the present invention consistently find optimal plans in reasonable amounts of time (e.g., in a few minutes in the worst case). Embodiments of the present invention may work either in conjunction with other optimizers or as a stand-alone query optimizer.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for optimizing a query, comprising:
a memory, and at least one processor operatively coupled to the memory;
a construction module executed via the at least one processor and capable of building a data structure for a query, the data structure including a plurality of components, wherein each of the plurality of components corresponds to at least one graph pattern;
a flow module executed via the at least one processor and capable of determining a plurality of flows of query variables between the plurality of components;
a cost determination and ranking module executed via the at least one processor and capable of determining a combination of the plurality of flows between the plurality of components that results in a minimum cost to execute the query; and
an integral linear programming (ILP) solver, wherein the cost determination and ranking module uses the ILP solver to solve a linear optimization problem of determining the combination of the plurality of flows between the plurality of components that results in the minimum cost under one or more constraints;
wherein a component of the plurality of components represents an access method for evaluating a graph pattern, the access method comprising a way to evaluate the graph pattern based on indexing of data in one or more databases.

2. The system according to claim 1, further comprising a constraint module capable of ruling out one or more flows that would violate semantics of one or more control statements in the query.

3. The system according to claim 1, further comprising a constraint module capable of generating the one or more constraints for ruling out invalid flows of the plurality of flows.

4. The system according to claim 3, wherein the one or more constraints are expressed as a function of decision variables.

5. The system according to claim 3, wherein the one or more constraints comprise one of a component constraint enforcing semantics of an external view of one or more of the components, a graph constraint enforcing semantics of the plurality of flows of query variables, and a predecessor constraint enforcing semantics of one or more potential predecessors.

6. The system according to claim 1, wherein the graph pattern comprises at least one of a triple pattern and an operation on more than one triple pattern.

7. The system according to claim 1, wherein a first component of the plurality of components comprises at least one proxy component representing a second component of the plurality of components that is connected to a query variable input of the first component.

8. A method for optimizing a query, comprising:
building a data structure for a query, the data structure including a plurality of components, wherein each of the plurality of components corresponds to at least one graph pattern;
determining a plurality of flows of query variables between the plurality of components;
determining a combination of the plurality of flows between the plurality of components that results in a minimum cost to execute the query; and
using an integral linear programming (ILP) solver to solve a linear optimization problem of determining the combination of the plurality of flows between the plurality of components that results in the minimum cost under one or more constraints;
wherein a component of the plurality of components represents an access method for evaluating a graph pattern, the access method comprising a way to evaluate the graph pattern based on indexing of data in one or more databases.

9. The method according to claim 8, wherein determining the plurality of flows of query variables comprises ruling out one or more flows that would violate semantics of one or more control statements in the query.

10. The method according to claim 8, further comprising generating the one or more constraints for ruling out invalid flows of the plurality of flows.

11. The method according to claim 10, wherein the one or more constraints are expressed as a function of decision variables.

12. The method according to claim 10, wherein the one or more constraints comprise one of a component constraint enforcing semantics of an external view of one or more of the components, a graph constraint enforcing semantics of the plurality of flows of query variables, and a predecessor constraint enforcing semantics of one or more potential predecessors.

13. The method according to claim 8, wherein the graph pattern comprises at least one of a triple pattern and an operation on more than one triple pattern.

14. The method according to claim 8, wherein a first component of the plurality of components comprises at least one proxy component representing a second component of the plurality of components that is connected to a query variable input of the first component.

15. The method according to claim 8, wherein determining the combination of the plurality of flows that results in the minimum cost is performed within a predetermined time limit.

16. An article of manufacture comprising a non-transitory computer readable storage medium comprising program code tangibly embodied thereon, which when executed by a computer, performs method steps for optimizing a query, the method steps comprising:
building a data structure for a query, the data structure including a plurality of components, wherein each of the plurality of components corresponds to at least one graph pattern;
determining a plurality of flows of query variables between the plurality of components;
determining a combination of the plurality of flows between the plurality of components that results in a minimum cost to execute the query; and
using an integral linear programming (ILP) solver to solve a linear optimization problem of determining the combination of the plurality of flows between the plurality of components that results in the minimum cost under one or more constraints;
wherein a component of the plurality of components represents an access method for evaluating a graph pattern, the access method comprising a way to evaluate the graph pattern based on indexing of data in one or more databases.

17. The article of manufacture according to claim 16, wherein determining the plurality of flows of query variables comprises ruling out one or more flows that would violate semantics of one or more control statements in the query.

18. The article of manufacture according to claim 16, wherein the method steps further comprise generating the one or more constraints for ruling out invalid flows of the plurality of flows.

* * * * *